US011828882B2

United States Patent
Amagawa et al.

(10) Patent No.: US 11,828,882 B2
(45) Date of Patent: Nov. 28, 2023

(54) DISTANCE MEASURING DEVICE AND DISTANCE MEASURING METHOD

(71) Applicant: Sony Semiconductor Solutions Corporation, Kanagawa (JP)

(72) Inventors: Keitarou Amagawa, Kanagawa (JP); Yusuke Moriyama, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 755 days.

(21) Appl. No.: 16/325,787

(22) PCT Filed: Aug. 14, 2018

(86) PCT No.: PCT/JP2018/030253
§ 371 (c)(1),
(2) Date: Feb. 15, 2019

(87) PCT Pub. No.: WO2019/044487
PCT Pub. Date: Mar. 7, 2019

(65) Prior Publication Data
US 2020/0088854 A1    Mar. 19, 2020

(30) Foreign Application Priority Data
Aug. 28, 2017  (JP) ................. 2017-163304

(51) Int. Cl.
*G01S 7/48*    (2006.01)
*G01S 7/4865*  (2020.01)
(Continued)

(52) U.S. Cl.
CPC ............ *G01S 7/4865* (2013.01); *G01S 17/10* (2013.01); *G01S 17/89* (2013.01)

(58) Field of Classification Search
USPC ....................................................... 356/5.01
See application file for complete search history.

(56) References Cited

U.S. PATENT DOCUMENTS 7,738,083 B2 *  6/2010  Luo .................. G01S 17/34
                                                356/5.15
7,755,743 B2    7/2010  Kumahara et al.
(Continued)

FOREIGN PATENT DOCUMENTS

| EP | 1944622 A1 | 7/2008 |
|----|------------|--------|
| JP | 2001116516 A | 4/2001 |

(Continued)

OTHER PUBLICATIONS

International Written Opinion and English translation thereof dated Nov. 13, 2018 in connection with International Application No. PCT/JP2018/030253.

(Continued)

*Primary Examiner* — James R Hulka
(74) *Attorney, Agent, or Firm* — Wolf, Greenfield & Sacks, P.C.

(57) ABSTRACT

The present technology relates to a distance measuring device and a distance measuring method that can improve the accuracy of distance measurement.
A control unit controls a light emitting operation by supplying a light emitting unit with a light emission timing signal for controlling the light emitting operation for emitting irradiation light and controls the light receiving operation by supplying a light receiving unit with a light reception timing signal for controlling the light receiving operation for receiving reflected light. A measuring unit measures a deviation time between the light emission timing at which the light emitting unit emits the irradiation light and the light reception timing at which the light receiving unit receives the reflected light, using the light emission timing signal and the light reception timing signal. The present technology can be applied, for example, to a case where distance measurement is performed by using the ToF method.

9 Claims, 15 Drawing Sheets

(51) Int. Cl.
  *G01S 17/10* (2020.01)
  *G01S 17/89* (2020.01)

(56) References Cited

U.S. PATENT DOCUMENTS

| | | | | |
|---|---|---|---|---|
| 8,699,008 | B2* | 4/2014 | Murakami | G01S 7/4912 |
| | | | | 356/4.01 |
| 9,109,888 | B2* | 8/2015 | Korekado | G01S 7/484 |
| 9,207,067 | B2* | 12/2015 | Yun | G01B 11/14 |
| 9,823,352 | B2* | 11/2017 | Meinherz | G01S 17/08 |
| 10,139,477 | B2* | 11/2018 | Iwasawa | G01S 7/4868 |
| 10,596,964 | B2* | 3/2020 | Nihei | B60Q 11/005 |
| 2007/0057209 | A1* | 3/2007 | Kurihara | H01L 27/14603 |
| | | | | 250/559.38 |
| 2009/0045359 | A1 | 2/2009 | Kumahara et al. | |
| 2009/0195769 | A1* | 8/2009 | Luo | G01S 17/34 |
| | | | | 356/4.01 |
| 2012/0050716 | A1* | 3/2012 | Murakami | G01S 17/89 |
| | | | | 356/4.01 |
| 2013/0278917 | A1 | 10/2013 | Korekado et al. | |
| 2014/0110563 | A1* | 4/2014 | Yun | G01B 11/14 |
| | | | | 250/206.1 |
| 2015/0102957 | A1* | 4/2015 | Mastio | G01S 5/14 |
| | | | | 342/146 |
| 2016/0011296 | A1* | 1/2016 | Keegan | G01S 5/0221 |
| | | | | 370/252 |
| 2016/0124089 | A1 | 5/2016 | Meinherz et al. | |
| 2017/0031011 | A1 | 2/2017 | Iwasawa | |
| 2017/0052254 | A1* | 2/2017 | Tateyama | G01S 15/8995 |
| 2017/0199271 | A1 | 7/2017 | Nihei | |

FOREIGN PATENT DOCUMENTS

| | | |
|---|---|---|
| JP | 2008-102000 A | 5/2008 |
| JP | 2009236657 A | 10/2009 |
| JP | 2013-195306 A | 9/2013 |
| JP | 2013-195307 A | 9/2013 |
| JP | 2017125829 A | 7/2017 |
| JP | 2017-143491 A | 8/2017 |
| KR | 20130098040 A | 9/2013 |

OTHER PUBLICATIONS

International Preliminary Report on Patentability and English translation thereof dated Mar. 12, 2020 in connection with International Application No. PCT/JP2018/030253.

Extended European Search Report dated Feb. 7, 2020 in connection with European Application No. 18850839.4.

International Search Report and English translation thereof dated Nov. 13, 2018 in connection with International Application No. PCT/JP2018/030253.

\* cited by examiner

DISTANCE MEASURING DEVICE AND DISTANCE MEASURING METHOD

CROSS-REFERENCE TO RELATED APPLICATIONS

This is a U.S. National Stage Application under 35 U.S.C. § 371, based on International Application No. PCT/JP2018/030253, filed in the Japanese Patent Office as a Receiving Office on Aug. 14, 2018, which claims priority under 35 U.S.C. § 119(a)-(d) or 35 U.S.C. § 365(b) to Japanese Patent Application Number JP2017-163304, filed in the Japanese Patent Office on Aug. 28, 2017, each of which is hereby incorporated by reference in its entirety.

TECHNICAL FIELD

The present technology relates to a distance measuring device and a distance measuring method, and in particular, relates to a distance measuring device and a distance measuring method which can improve the accuracy of distance measurement, for example.

BACKGROUND ART

For example, Patent Document 1 describes a distance measuring system that corrects light emission timing.

CITATION LIST

Patent Document

Patent Document 1: Japanese Patent Application Laid-Open No. 2013-195307

SUMMARY OF THE INVENTION

Problems to be Solved by the Invention

In the distance measuring device of the time of flight (ToF) method, irradiation light is emitted, and reflected light that is the irradiation light reflected on a substance (object) and returned is received, so that distance measurement is performed according to the period of time after the irradiation light is emitted until the reflected light is received. Therefore, in a case where the timing of starting emission of the irradiation light or the timing of starting reception of the reflected light deviates from the ideal (theoretical) timing, an error occurs in the distance measurement, and the accuracy of the distance measurement deteriorates. Furthermore, in a case where how much the timing of starting the light emission or light reception deviates from the ideal timing in detail is unknown, it is difficult to correct the deviation appropriately, that is, to correct the error of distance measurement.

In a case where a special environment for measuring how much the deviation between the distance obtained by distance measurement and the actual distance is, for example, an environment in which the distance to an object disposed at a certain fixed distance can be measured can be prepared, the adjustment for correcting the deviation from the theoretical value of the amount of received light can be performed from the amount of the received reflected light obtained by receiving the reflected light.

However, since the distance to the object always changes in an environment in which the distance measuring device is used by a user on a daily basis, for example, in an environment where the user is driving an automobile, it is difficult for the distance measuring device to successively measure and correct the deviation from the theoretical value of the received light amount during the distance measuring operation for measuring a distance.

The present technology has been made in view of such a situation, and improving the accuracy of distance measurement is intended.

Solutions to Problems

A distance measuring device according to a first aspect of the present technology includes a light receiving unit that receives reflected light from an object of irradiation light emitted from a light emitting unit that emits light, a control unit that controls a light emitting operation by supplying the light emitting unit with a light emission timing signal for controlling the light emitting operation for emitting the irradiation light and controls a light receiving operation by supplying the light receiving unit with a light reception timing signal for controlling the light receiving operation for receiving the reflected light, and a measuring unit that measures a deviation time between a light emission timing at which the light emitting unit emits the irradiation light and a light reception timing at which the light receiving unit receives the reflected light, by using the light emission timing signal and the light reception timing signal.

A distance measuring method according to a first aspect of the present technology is a distance measuring method including causing a distance measuring device to measure a deviation time between a light emission timing at which a light emitting unit emits irradiation light and a light reception timing at which a light receiving unit receives reflected light, by using a light emission timing signal and a light reception timing signal, the distance measuring device including the light receiving unit for receiving the reflected light from an object of the irradiation light emitted from the light emitting unit that emits light and a control unit for controlling a light emitting operation by supplying the light emitting unit with the light emission timing signal for controlling the light emitting operation for emitting the irradiation light and for controlling a light receiving operation by supplying the light receiving unit with the light reception timing signal for controlling the light receiving operation for receiving the reflected light.

In the distance measuring device and the distance measuring method according to the first aspect of the present technology, reflected light from an object of irradiation light emitted from a light emitting unit that emits light is received. In addition, the light emitting unit is supplied with a light emission timing signal for controlling a light emitting operation for emitting the irradiation light so that the light emitting operation is controlled, and the light receiving unit is supplied with a light reception timing signal for controlling a light receiving operation for receiving the reflected light so that the light receiving operation is controlled, and a deviation time between a light emitting timing at which the light emitting unit emits the irradiation light and a light reception timing at which the light receiving unit receives the reflected light is measured by using the light emission timing signal and the light reception timing signal.

A distance measuring device according to a second aspect of the present technology includes a chip in which a first substrate and a second substrate are stacked and a light emitting unit, and the first substrate includes a light receiving unit, the second substrate includes a control unit, and the control unit supplies a light emission timing signal to the light emitting unit and supplies a light reception timing signal to the light receiving unit.

In the distance measuring device according to the second aspect of the present technology, a first substrate having a light receiving unit and a second substrate having a control unit are stacked to be formed into a chip and a light emitting unit is provided, and a light emission timing signal is supplied to the light emitting unit from the control unit and a light reception timing signal is supplied to the light receiving unit.

Effects of the Invention

According to the present technology, the accuracy of distance measurement can be improved.

Note that the effects described herein are not necessarily limited, and any one of the effects described in the present disclosure may be applied.

MODE FOR CARRYING OUT THE INVENTION

<1. First Embodiment of Distance Measuring System>

Figure 1:
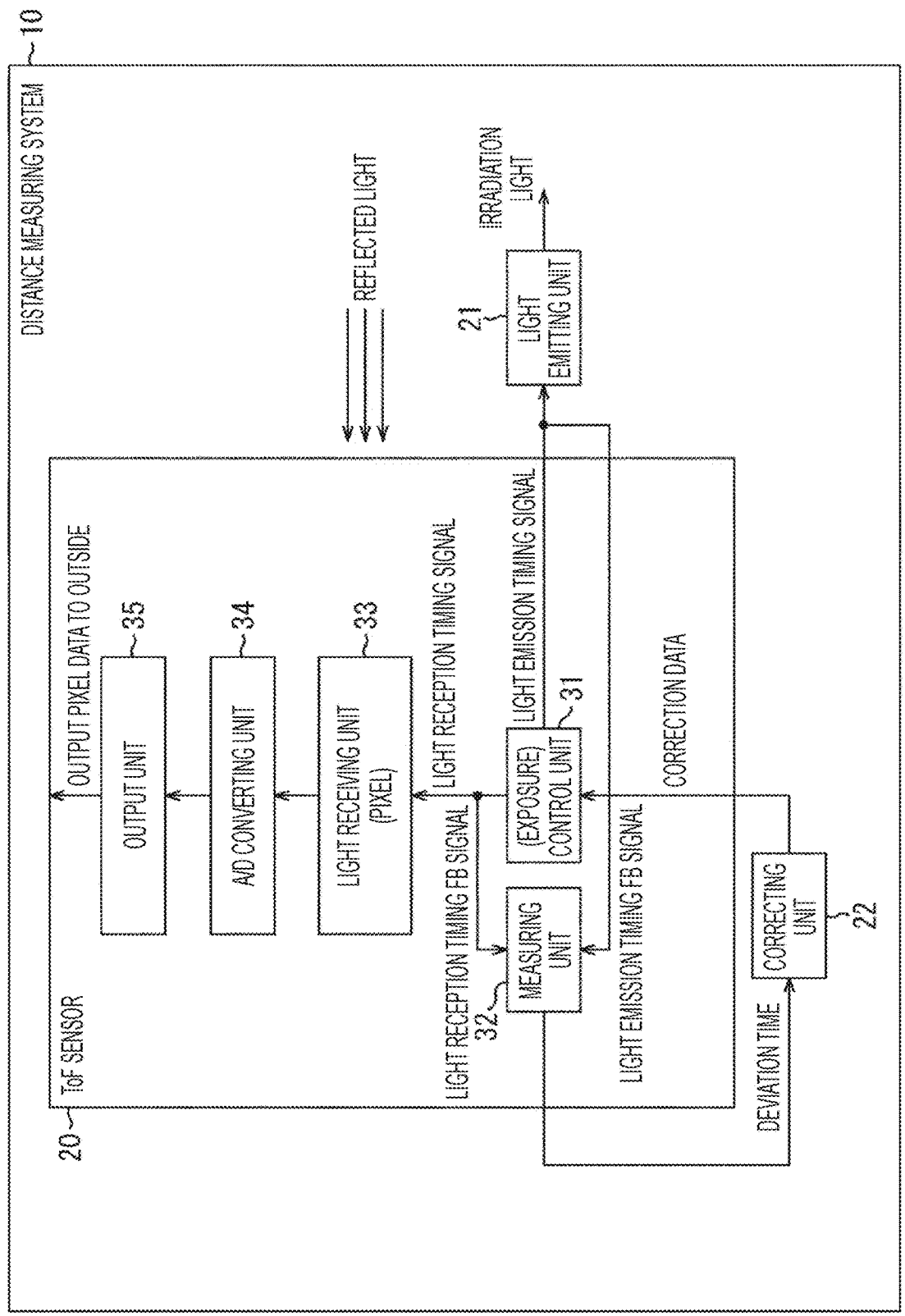
FIG. 1 is a block diagram showing a configuration example of a first embodiment of a distance measuring system to which the present technology is applied.

FIG. 1 is a block diagram showing a configuration example of a first embodiment of a distance measuring system to which the present technology is applied.

A distance measuring system 10 shown in FIG. 1 is constituted by having a ToF sensor 20, a light emitting unit 21, and a correcting unit 22.

The ToF sensor 20 is constituted by having a control unit 31, a measuring unit 32, a light receiving unit 33, an A/D converting unit 34, and an output unit 35.

Correction data is supplied from the correcting unit 22 to the (exposure) control unit 31. The control unit 31 supplies the light emitting unit 21 with a light emission timing signal for controlling the light emitting operation for emitting irradiation light and supplies the light receiving unit 33 with a light reception timing signal for controlling the light receiving (exposure) operation for receiving the reflected light from the object of the irradiation light. In addition, the control unit 31 corrects one or both (timing) of the light emission timing signal and the light reception timing signal according to the correction data from the correcting unit 22.

A light emission timing signal is fed back to the measuring unit 32 as a light emission timing feedback (FB) signal from the middle of the wiring through which the light emission timing signal is supplied to the light emitting unit 21 from the control unit 31.

Furthermore, the light reception timing signal is fed back to the measuring unit 32 as a light reception timing FB signal from the middle of the wiring through which the light reception timing signal is supplied to the light receiving unit 33 from the control unit 31.

Using the light emission timing FB signal and the light reception timing FB signal fed back from the middle of the wiring as described above, the measuring unit 32 measures a temporal deviation (hereinafter, referred to as a deviation time) between the timing at which the light emitting unit 21 performs the light emitting operation for emitting the irradiation light (hereinafter, referred to as light emission timing) and the timing at which the light receiving unit 33 performs the light receiving operation for receiving the reflected light (hereinafter, referred to as light reception timing), and supplies the deviation time obtained from the measurement result to the correcting unit 22.

For example, the measuring unit 32 measures time difference between the timing of giving an instruction to start light emission of the light emission timing FB signal (for example, the timing of the rising edge of the pulse as the light emission timing FB signal) and the timing of giving an instruction to start light reception of the light reception timing FB signal (for example, the timing of the rising edge of the pulse as the light reception timing FB signal), as the deviation time.

Incidentally, since the light receiving unit 33 is built in the ToF sensor 20 together with the control unit 31, the wiring for supplying the light reception timing signal from the control unit 31 to the light receiving unit 33 can be shortened. In this case, not so long delay occurs between the output timing of the light reception timing signal giving an instruction to start the light reception from the control unit 31 (for example, the rising edge of the pulse as the light reception timing signal) and the timing of the light receiving unit 33 actually starting light reception in response to the supply of the light reception timing signal.

On the other hand, since the light emitting unit 21 is provided outside the ToF sensor 20 having the control unit 31 therein, the wiring for supplying the light emission timing signal from the control unit 31 to the light emitting unit 21 becomes longer. In this case, there sometimes occurs a delay that cannot be ignored between the output timing of the light emission timing signal giving an instruction to start light emission from the control unit (for example, the rising edge of the pulse as the light emission timing signal) and the timing of the light emitting unit 21 actually starting light emission in response to the supply of the light emission timing signal.

Therefore, as the position at which the light emission timing signal is fed back to the measuring unit 32 as the light emission timing FB signal, the position approximate to the midpoint of the wiring connecting the ToF sensor 20 and the light emitting unit 21 can be adopted. In this case, the timing at which the light emission timing signal arrives at the light emitting unit 21 and the timing at which the light emission timing signal arrives at the measuring unit 32 as the light emission timing FB signal substantially coincide with each other, and thus the light emission timing FB signal can be handled as a signal accurately representing the timing at which the light emission of the light emitting unit 21 starts.

In addition, the position at which the light emission timing signal is fed back to the measuring unit 32 as the light emission timing FB signal is variable depending on the situation and may be provided either inside the ToF sensor 20 or outside the ToF sensor 20. For example, in a case where it is difficult to provide a terminal for receiving a signal supplied from the outside to the ToF sensor 20 due to the structure of the ToF sensor 20, inputting a light emission timing FB signal supplied from the outside to the ToF sensor 20 is difficult. Therefore, in such a case, the position at which the light emission timing signal is fed back to the measuring unit 32 as the light emission timing FB signal may be provided inside the ToF sensor 20.

The light receiving unit 33 is configured by a plurality of pixels (not shown) arranged two-dimensionally. According to the light reception timing signal supplied from the control unit 31, the light receiving unit 33 performs a light receiving operation for receiving the reflected light at the pixels, and generates an electric charge corresponding to the light amount (received light amount) of the reflected light obtained by the light receiving operation. A pixel signal as a voltage corresponding to the electric charge generated in the pixels is read out from the light receiving unit 33 and supplied to the A/D converting unit 34.

The A/D converting unit 34 performs A/D conversion on the pixel signal from the light receiving unit 33, and supplies the pixel data obtained as a result of the A/D conversion to the output unit 35.

The output unit 35 outputs the pixel data supplied from the A/D converting unit 34 to the outside of the ToF sensor 20.

The light emitting unit 21 is connected to the control unit 31 of the ToF sensor 20 by a wiring and performs a light emitting operation for emitting irradiation light in accordance with the light emission timing signal supplied from the control unit 31 via the wiring.

The correcting unit 22 generates correction data for correcting one or both of the light emission timing signal and the light reception timing signal according to the deviation time supplied from the measuring unit 32, and supplies the correction data to the control unit 31 of the ToF sensor 20 to control the correction of the light emission timing signal and the light reception timing signal in the control unit 31.

Here, the ToF sensor 20 may be configured by arranging the control unit 31, the measuring unit 32, the light receiving unit 33, the A/D converting unit 34, and the output unit 35 on a single substrate, or may be configured by arranging the units on a plurality of substrates and by stacking the plurality of substrates.

Figure 2:
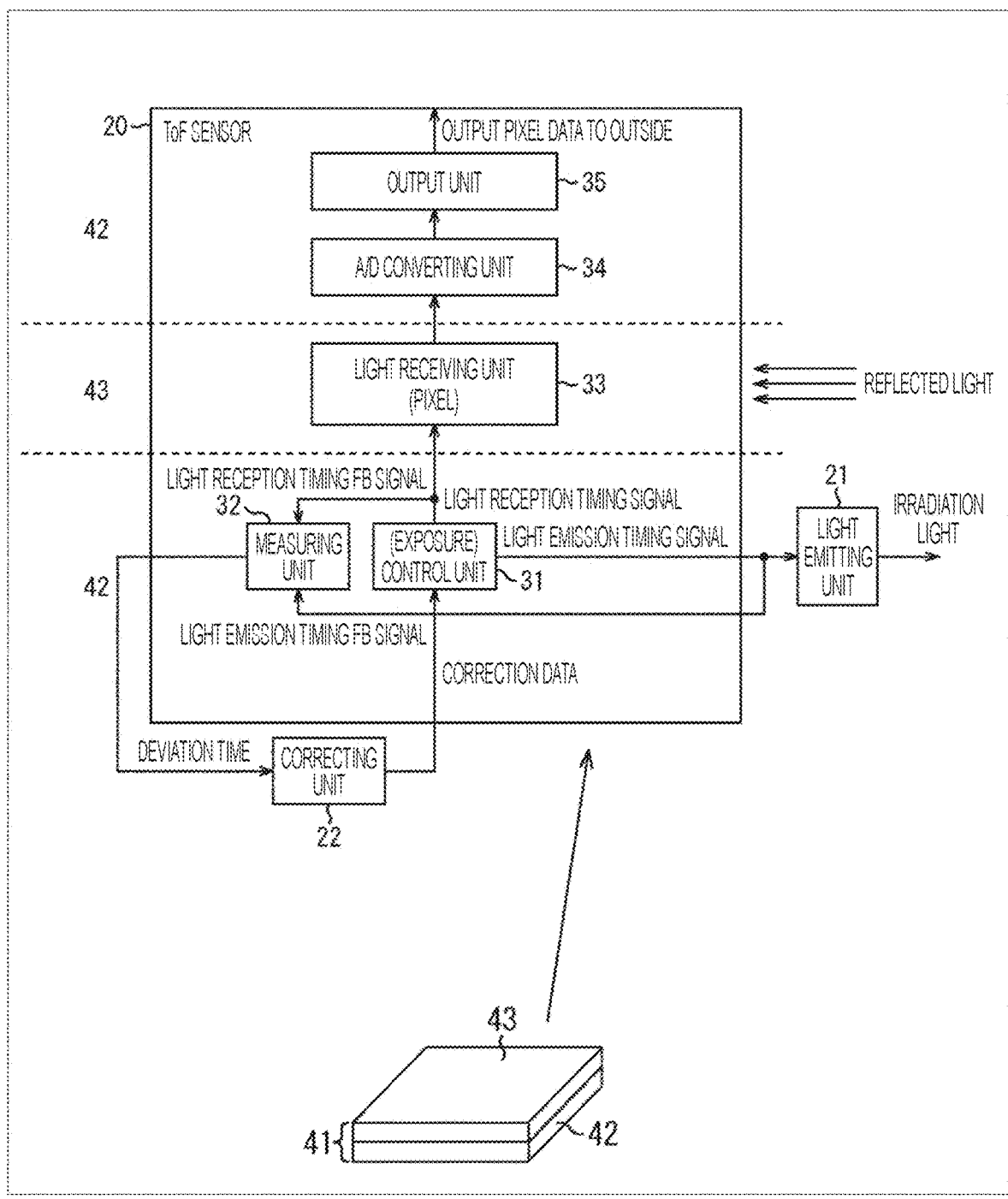
FIG. 2 is a diagram illustrating a configuration example of a ToF sensor including a plurality of substrates.

FIG. 2 is a diagram for illustrating a configuration example of the ToF sensor 20 in a case where the ToF sensor 20 is configured with a chip having a laminated structure in which a plurality of substrates are stacked.

In FIG. 2, the ToF sensor 20 is constituted by a chip 41 in which a plurality of substrates are stacked.

The chip 41 is configured by stacking a lower substrate 42 and an upper substrate 43 in this order from the bottom to the top. On the lower substrate 42, the control unit 31, the measuring unit 32, the A/D converting unit 34, and the output unit 35 are formed, and the light receiving unit 33 is formed on the upper substrate 43.

As described above, in the ToF sensor 20 including the chip 41 in which the lower substrate 42 and the upper substrate 43 are stacked, the light emission timing FB signal and the light reception timing FB signal are supplied to the measuring unit 32 formed on the lower substrate 42 and the deviation time is measured using the light emission timing FB signal and the light reception timing FB signal.

Figure 3:
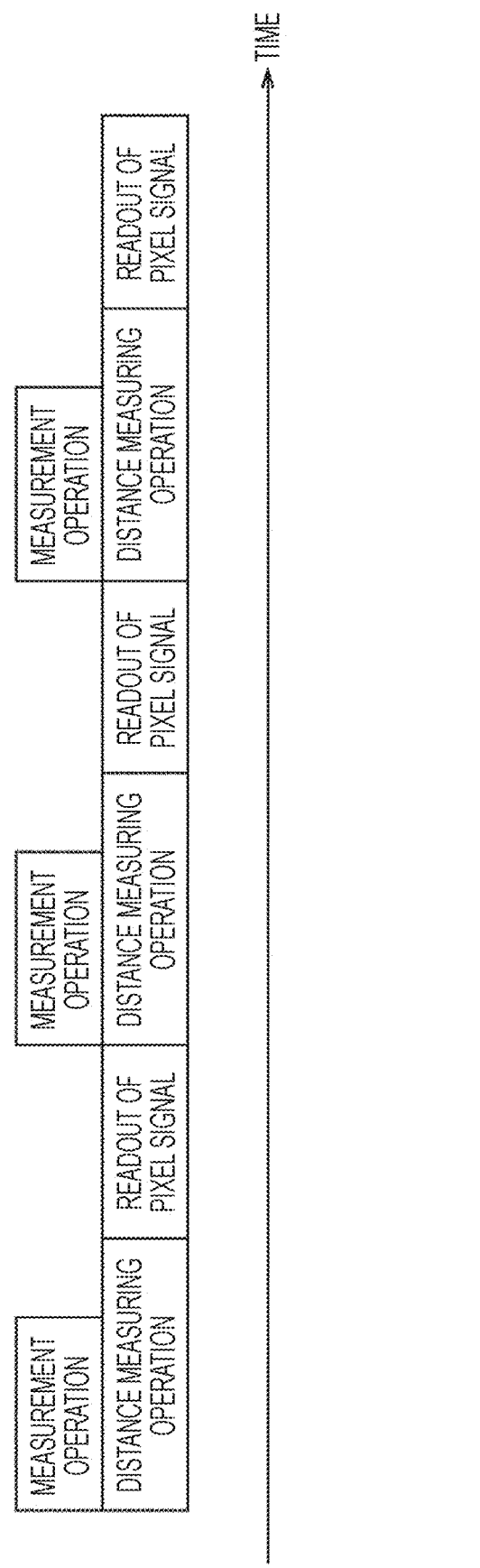
FIG. 3 is a diagram for illustrating an example of the operation of the distance measuring system.

FIG. 3 is a diagram for illustrating an example of the operation of the distance measuring system 10.

In FIG. 3, the distance measuring system 10 performs a distance measuring operation. That is, in the distance measuring system 10, the control unit 31 outputs the light emission timing signal and the light reception timing signal. The light emitting unit 21 performs a light emitting operation to emit the irradiation light in accordance with the light emission timing signal output from the control unit 31, and the light receiving unit 33 performs the light receiving operation to receive reflected light of the irradiation light from the object in accordance with the light reception timing signal output from the control unit 31, and generates an electric charge corresponding to the light amount of the reflected light.

In the distance measuring system 10, after the distance measuring operation described above, pixel signals as electric signals corresponding to the electric charge generated by the light receiving unit 33 are read out. In other words, the pixel signal corresponding to the electric charge generated by the light receiving unit 33 is read out from the light receiving unit 33 and supplied to the A/D converting unit 34. The A/D converting unit 34 performs A/D conversion on the pixel signal read out from the light receiving unit 33, and supplies the pixel data obtained as a result of the conversion to the output unit 35. The output unit 35 outputs pixel data from the A/D converting unit 34.

In FIG. 3, the distance measuring operation and reading out of the pixel signal described above are repeatedly performed.

Further, in FIG. 3, a measurement operation for measuring the deviation time is performed in parallel with the distance measuring operation. That is, the light emission timing signal and the light reception timing signal output from the control unit 31 are fed back to the measuring unit 32 as the light emission timing FB signal and the light reception timing FB signal, respectively in the distance measuring operation. The measuring unit 32 measures the time difference between the light emission timing FB signal and the light reception timing FB signal as a deviation time. That is, for example, the measuring unit 32 measures the time from the timing of giving an instruction to start light emission of the light emission timing FB signal which is regarded as the basis time until the timing of giving an instruction to start light reception of the light reception timing FB signal, as the deviation time. The deviation time is output from the measuring unit 32 to the outside of the ToF sensor 20 and supplied to the correcting unit 22.

In FIG. 3, the measurement operation as described above is repeated in parallel with the distance measuring operation.

As shown in FIG. 3, in a case where the measurement operation is performed in parallel with the distance measuring operation, the deviation time in the distance measuring operation can be grasped during the distance measuring operation.

Figure 4:
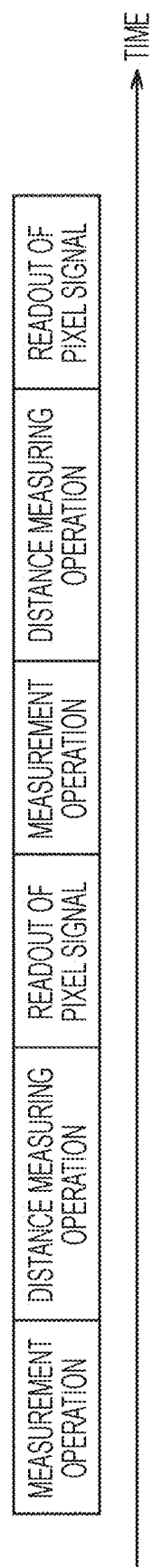
FIG. 4 is a diagram for illustrating another example of the operation of the distance measuring system.

FIG. 4 is a diagram for illustrating another example of the operation of the distance measuring system 10.

In FIG. 3, the case where the measurement operation and the distance measuring operation are performed in parallel has been described, but the measurement operation and the distance measuring operation do not necessarily have to be performed in parallel. That is, the measurement operation and the distance measuring operation can be performed at different timings, as shown in FIG. 4.

In FIG. 4, first, the measurement operation is performed. In other words, in the distance measuring system 10, the control unit 31 outputs the light emission timing signal and the light reception timing signal similarly to the case of the distance measuring operation. The light emission timing signal and the light reception timing signal output from the control unit 31 are fed back to the measuring unit 32 as the light emission timing FB signal and the light reception timing FB signal, respectively. The measuring unit 32 measures the time difference between the light emission timing FB signal and the light reception timing FB signal as a deviation time.

Incidentally, in the measurement operation in FIG. 4, since the light emission timing signal output from the control unit 31 is supplied to the light emitting unit 21, the light emitting unit 21 performs the light emitting operation. Similarly, since the light reception timing signal output from the control unit 31 is supplied to the light receiving unit 33, the light receiving unit 33 performs the light receiving operation. In the light receiving operation, the light receiving unit 33 receives the reflected light from the object of the irradiation light emitted by the light emitting operation, and generates the electric charge corresponding to the light amount of the reflected light.

In FIG. 4, since the distance measuring operation is performed at a timing different from the timing of the measurement operation, the electric charge generated in the measurement operation is unnecessary in the light receiving unit 33. Therefore, during the measurement operation, the control unit 31 puts the pixels of the light receiving unit 33 in a reset state (for example, turns on reset transistors (not shown) constituting the pixels) and discharges (discards) charges generated in the measurement operation.

In FIG. 4, after the measurement operation, similarly to the case of FIG. 3, distance measuring operation and reading out of the pixel signal are performed.

That is, the control unit 31 outputs the light emission timing signal and the light reception timing signal. The light emitting unit 21 performs a light emitting operation to emit the irradiation light in accordance with the light emission timing signal output from the control unit 31, and the light receiving unit 33 performs the light receiving operation to receive reflected light of the irradiation light from the object in accordance with the light reception timing signal output from the control unit 31, and generates an electric charge corresponding to the light amount of the reflected light.

In the light receiving unit 33, after the above distance measuring operation, the A/D converting unit 34 reads out the pixel signal as the electric signal regarding the electric charge generated by the light receiving unit 33, and performs the A/D conversion on the pixel signal. The A/D converting unit 34 supplies the pixel data obtained as a result of the A/D conversion to the output unit 35, and the output unit 35 outputs the pixel data from the A/D converting unit 34.

In FIG. 4, the measurement operation, distance measuring operation, and reading out of the pixel signal described above are repeatedly performed.

As described above, in a case where the measurement operation and the distance measuring operation are performed at different timings, the light emission timing signal and the light reception timing signal used in the distance measuring operation performed immediately after the measurement operation can be corrected, according to the deviation time obtained in the measurement operation, and the accuracy of distance measurement performed by the distance measuring operation can be enhanced (error in distance measurement can be reduced).

Figure 5:
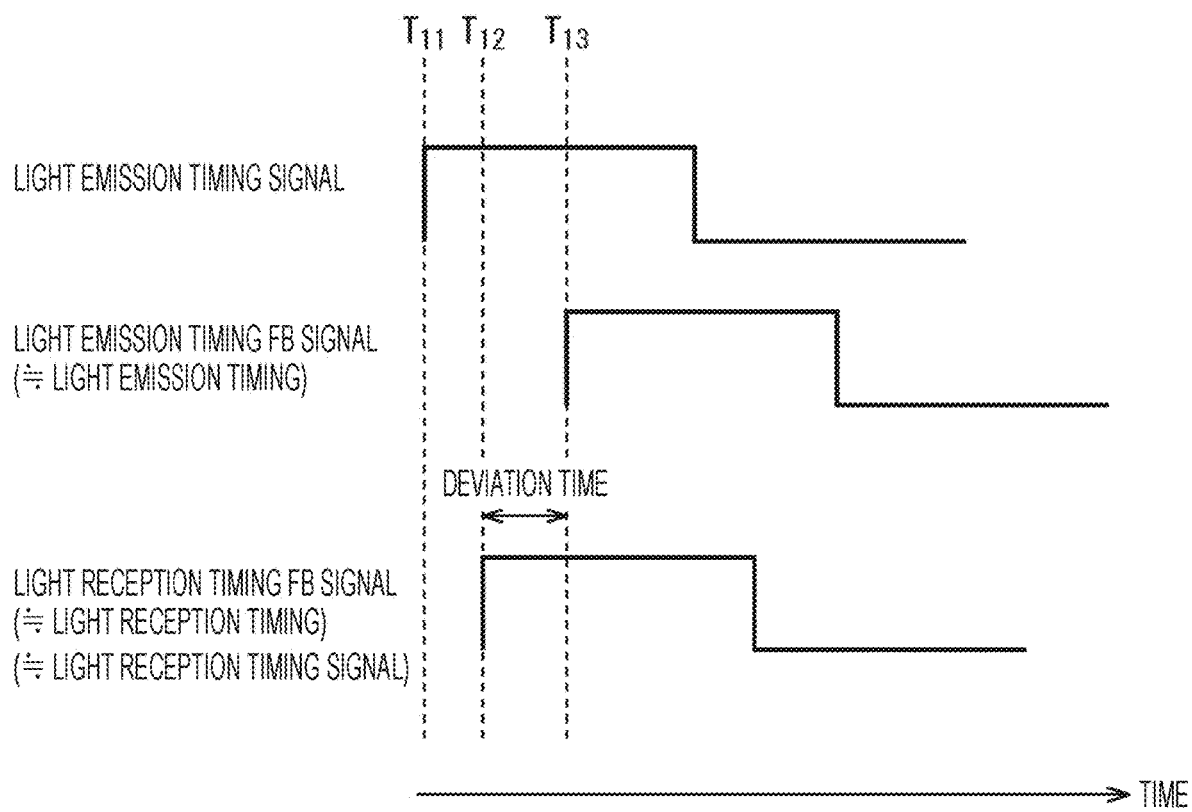
FIG. 5 is a timing chart showing an example of a light emission timing FB signal and a light reception timing FB signal.

FIG. 5 is a timing chart showing an example of the light emission timing FB signal and the light reception timing FB signal.

Note that, it is assumed herein that the light emission timing signal is a pulse (signal), and a period during which the pulse is on the H (High) level represents a period during which light emission operation for emitting irradiation light is performed. Similarly, it is assumed that the light reception timing signal is a pulse, and the period during which the pulse is on the H level represents a period during which the light receiving operation for receiving the reflected light (and holding the electric charge corresponding to the reflected light) is performed.

Further, it is assumed that the output of the light emission timing signal and the light reception timing signal means, for example, the output of the rising edge of the pulse as the light emission timing signal or the light reception timing signal.

Furthermore, in the distance measuring system 10, it is assumed that the position at which the light emission timing signal is fed back to the measuring unit 32 as the light emission timing FB signal is located substantially at the midpoint of the wiring connecting the ToF sensor 20 and the light emitting unit 21, and as a result, the timing at which the light emission timing signal arrives at the light emitting unit 21 and the timing at which the light emission timing FB signal arrives at the measuring unit 32 substantially coincide with each other, as illustrated in FIG. 1. That is, it is assumed that the light emission timing represented by the light emission timing FB signal (a period during which the pulse is on the H level) substantially coincides with the light emission timing (timing at which the light emission operation is performed).

Now, as shown in FIG. 5, the control unit 31 outputs a light emission timing signal at time $T_{11}$, and the light emission timing signal is assumed to arrive at the measuring unit 32 at time $T_{13}$ later than the time $T_{11}$, as the light emission timing FB signal. As described above, (the light emission timing indicated by) the light emission timing FB signal and the light emission timing substantially coincide with each other.

Further, it is assumed that the control unit 31 outputs the light reception timing signal, and the light reception timing signal arrives at the measuring unit 32 as the light reception timing FB signal at time $T_{12}$ later than the time $T_{11}$ and earlier than the time $T_{21}$.

As described with reference to FIG. 1, not so long delay occurs between the timing of the output of the light reception timing signal of the control unit 31 and the timing at which the light receiving unit 33 actually starts receiving light reception upon receiving the light reception timing signal. Further, there is not so long delay between the light reception timing signal and the light reception timing FB signal. From the above, the light reception timing (the period during which the pulse is on the H level) represented by the light reception timing signal and the light reception timing FB signal substantially coincides with the light reception timing. In other words, (the timing of light reception indicated by) the light reception timing signal, (the timing of light reception indicated by) the light reception timing FB signal, and the light reception timing (timing at which the light reception operation is performed) substantially coincide with one another.

In FIG. 5, the time period between the time $T_{13}$ at which the light emission timing FB signal arrives at the measuring unit 32 and the time $T_{12}$ at which the light reception timing FB signal arrives at the measuring unit 32 is measured as the deviation time.

Figure 6:
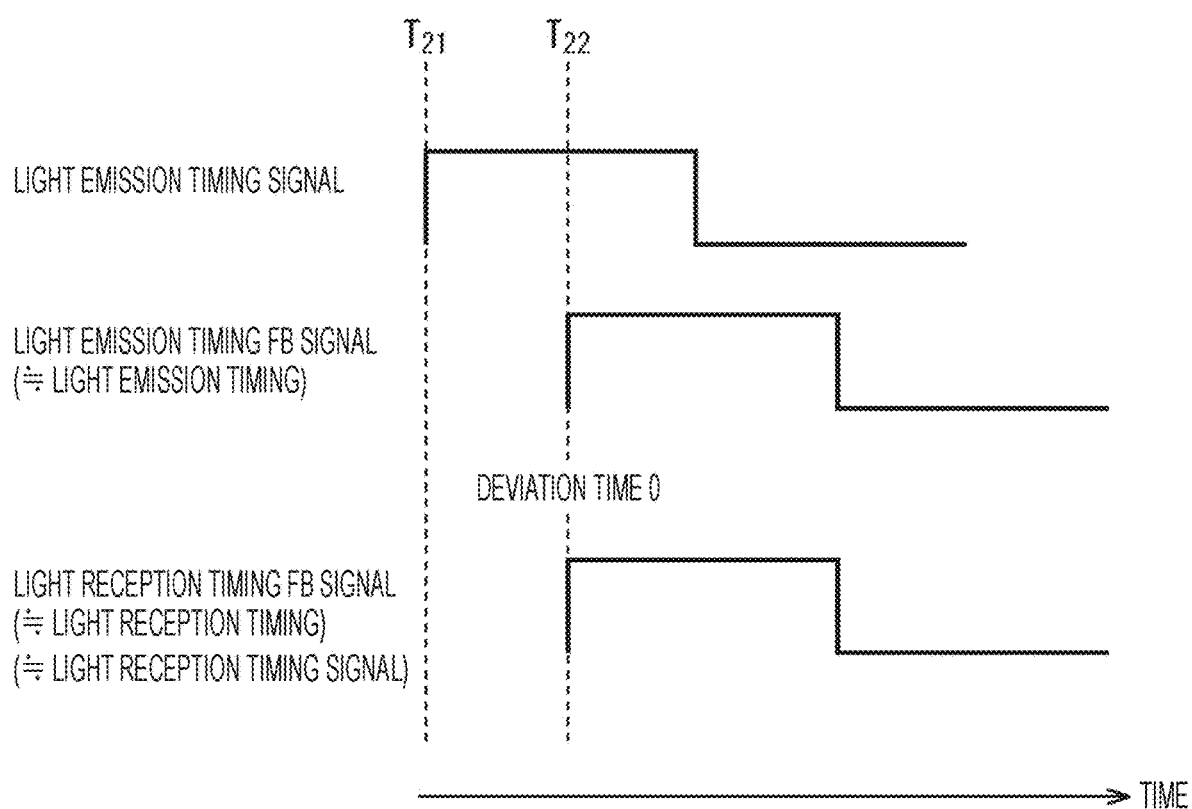
FIG. 6 is a timing chart showing another example of the light emission timing FB signal and the light reception timing FB signal.

FIG. 6 is a timing chart showing another example of the light emission timing FB signal and the light reception timing FB signal.

In FIG. 6, the control unit 31 outputs the light emission timing signal at time $T_{21}$, and the light emission timing signal arrives at the measuring unit 32 as the light emission timing FB signal at time $T_{22}$ later than the time $T_{21}$.

Further, the control unit 31 outputs a light reception timing signal, and the light reception timing signal arrives at the measuring unit 32 as the light reception timing FB signal at the time $T_{22}$ that is the same as the time at which the light emission timing FB signal arrives at the measuring unit 32.

In FIG. 6, the time $T_{22}$ at which the light emission timing FB signal arrives at the measuring unit 32 and the time $T_{22}$ at which the light reception timing FB signal arrives at the measuring unit 32 coincide with each other, and zero is measured as the deviation time.

Now, as shown in FIG. 6, assuming that the case where the deviation time is zero is an ideal case without error in the distance measurement, correction data for correcting the light emission timing signal and the light reception timing signal is generated in the correcting unit 22 so as to set the deviation time to zero in the ideal case.

That is to say, in a case where the time $T_{13}$ at which the light emission timing FB signal arrives at the measuring unit 32 is later than the time $T_{12}$ at which the light reception timing FB signal arrives at the measuring unit, 32 for example, as shown in FIG. 5, the correcting unit 22 generates the correction data for advancing (the output of) the light emission timing signal, correction data for delaying (the output of) the light reception timing signal, or correction data for delaying the light reception timing signal while advancing the light emission timing signal so that the deviation time becomes zero in the ideal case.

Here, the deviation time in the ideal case where there is no distance measurement error is also referred to as a reference deviation signal. Here, in order to simplify the description, zero is adopted as the reference deviation time, but the reference deviation time is obtained by measuring the distance to an object disposed at a known distance before shipment of the ToF sensor 20 or the like, and can be stored in the measuring unit 32. In this case, the reference deviation time stored in the measuring unit 32 is supplied from the measuring unit 32 to the correcting unit 22, and the reference deviation time from the measuring unit 32 is used so that correction data can be generated in the correcting unit 22.

<2. Correction Processing of Distance Measuring Device>

Figure 7:
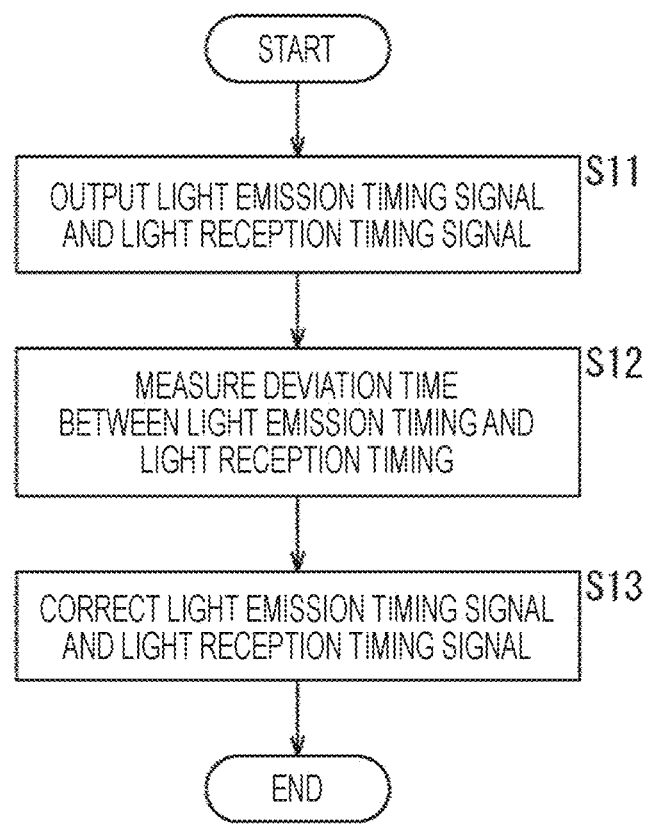
FIG. 7 is a flowchart illustrating correction processing performed by the distance measuring system.

FIG. 7 is a flowchart illustrating correction processing performed by the distance measuring system 10.

In the correction processing, the deviation time is measured, and one or both of the light emission timing signal and the light reception timing signal are corrected according to the deviation time.

For example, when the distance measuring system 10 is activated, the correction processing is started, and the control unit 31 outputs the light emission timing signal and the light reception timing signal in step S11, and the processing proceeds to step S12.

The light emission timing signal output from the control unit 31 is supplied to the light emitting unit 21. Further, the light emission timing signal is fed back to the measuring unit 32 as the light emission timing FB signal from a position on the way through the wiring from the control unit 31 to the light emitting unit 21.

In addition, the light reception timing signal output from the control unit 31 is supplied to the light receiving unit 33. Further, the light reception timing signal is fed back to the measuring unit 32 as a light reception timing FB signal from a position on the way through the wiring from the control unit 31 to the light receiving unit 33.

In step S12, the measuring unit 32 measures the deviation time between the light emission timing and the light reception timing from the light emission timing FB signal and the light reception timing FB signal fed back to the measuring unit 32, and supplies the measured deviation time to the correcting unit 22.

The correcting unit 22 generates correction data for correcting either the light emission timing signal or the light reception timing signal or both of the light emission timing signal and the light reception timing signal on the basis of the deviation time from the measuring unit 32 and supplies the correction data to the control unit 31, and then the processing proceeds from step S12 to step S13.

In step S13, the control unit 31 corrects either the light emission timing signal or the light reception timing signal, or both of the light emission timing signal and the light reception timing signal, according to the correction data from the correcting unit 22. With this correction, in step S11 to be executed next, the control unit 31 outputs the corrected light emission timing signal and corrected light reception timing signal.

As described above, according to the ToF sensor 20, the deviation time between the light emission timing and the light reception timing can be easily and quantitatively grasped by the measurement operation performed in the measuring unit 32.

Furthermore, according to the ToF sensor 20, the error of the distance can be confirmed from the deviation time instead of checking of the error between the distance obtained from the pixel data output to the outside from the ToF sensor 20 and the actual distance.

Further, according to the ToF sensor 20, the deviation time can be easily confirmed at the time of actual use of the ToF sensor 20, inspection of the ToF sensor 20 after manufacturing, confirmation of operation of the ToF sensor 20 after design, etc. For example, in the inspection of the ToF sensor 20 performed while the voltage condition, the temperature condition, or the like is changed, how much deviation time occurs for each voltage condition and each temperature condition can be easily confirmed.

Furthermore, according to the ToF sensor 20, a deviation time influenced by an environment where the ToF sensor 20 is used, for example, by a change in temperature or voltage or the like, is measured, and the light emission timing signal and the light reception timing signal can be corrected according to the deviation time, the signals being appropriate for the environment where the ToF sensor 20 is used.

Further, according to the ToF sensor 20, the control unit 31 can correct the individual variation of the light emission timing signal and the light reception timing signal of the ToF sensor 20 alone after manufacturing or the ToF sensor 20 built in the distance measuring system 10, so that the deviation time becomes the reference deviation time. Furthermore, the light emission timing signal and the light reception timing signal can be corrected so as to dynamically adjust the variation of the deviation time from the reference deviation time, which occurs when the distance measuring operation is actually performed.

<3. Configuration Example According to Second Embodiment of Distance Measuring System>

Figure 8:
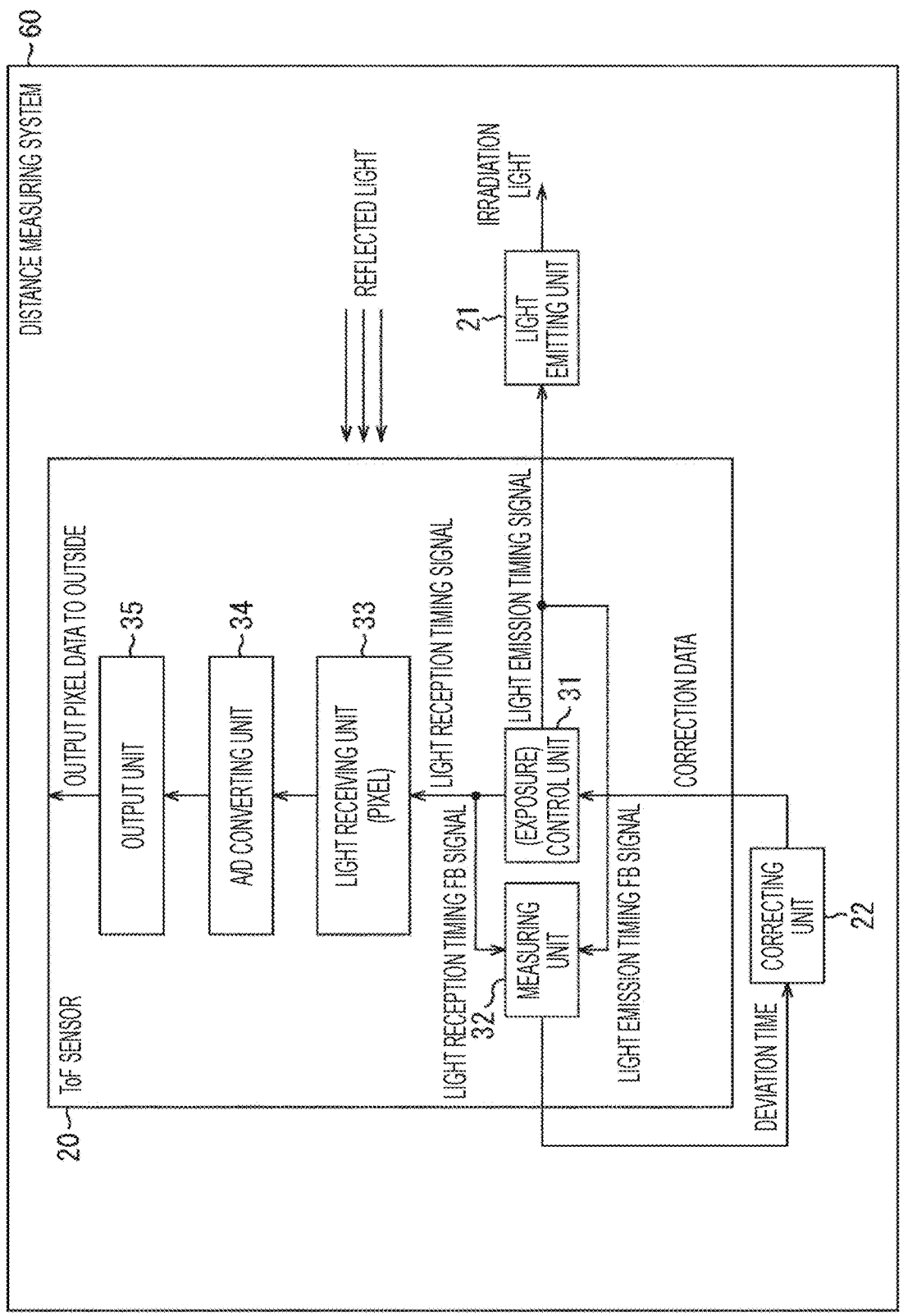
FIG. 8 is a block diagram showing a configuration example of a second embodiment of the distance measuring system to which the present technology is applied.

FIG. 8 is a block diagram showing a configuration example according to a second embodiment of the distance measuring system to which the present technology is applied.

Incidentally, in the figure, parts corresponding to those in FIG. 1 are denoted by the same reference numerals, and the description thereof is appropriately given below.

In FIG. 8, a distance measuring system 60 includes the ToF sensor 20, the light emitting unit 21, and the correcting unit 22. Therefore, the distance measuring system 60 is constructed in a similar manner to the distance measuring system 10 in FIG. 1.

However, the distance measuring system 60 in FIG. 8 is different from the distance measuring system 10 in that the position at which the light emission timing signal is fed back as the light emission timing FB signal is located inside the ToF sensor 20 in the distance measuring system 60 while the position at which the light emission timing signal is fed back as the light emission timing FB signal to the measuring unit 32 is located a position outside the ToF sensor 20 in the distance measuring system 10.

In a case where the ToF sensor 20 can be provided with a terminal for receiving a signal from the outside, a light emission timing FB signal fed back from the outside of the ToF sensor 20 can be input to the ToF sensor 20, as shown in FIG. 1. However, in a case where it is difficult to provide a terminal for receiving a signal from the outside to the ToF sensor 20 due to design restrictions or the like, the ToF sensor 20 can adopt a structure in which the feedback of the light emission timing signal is performed inside the ToF sensor 20, as shown in FIG. 8.

<4. Configuration Example According to Third Embodiment of Distance Measuring System>

Figure 9:
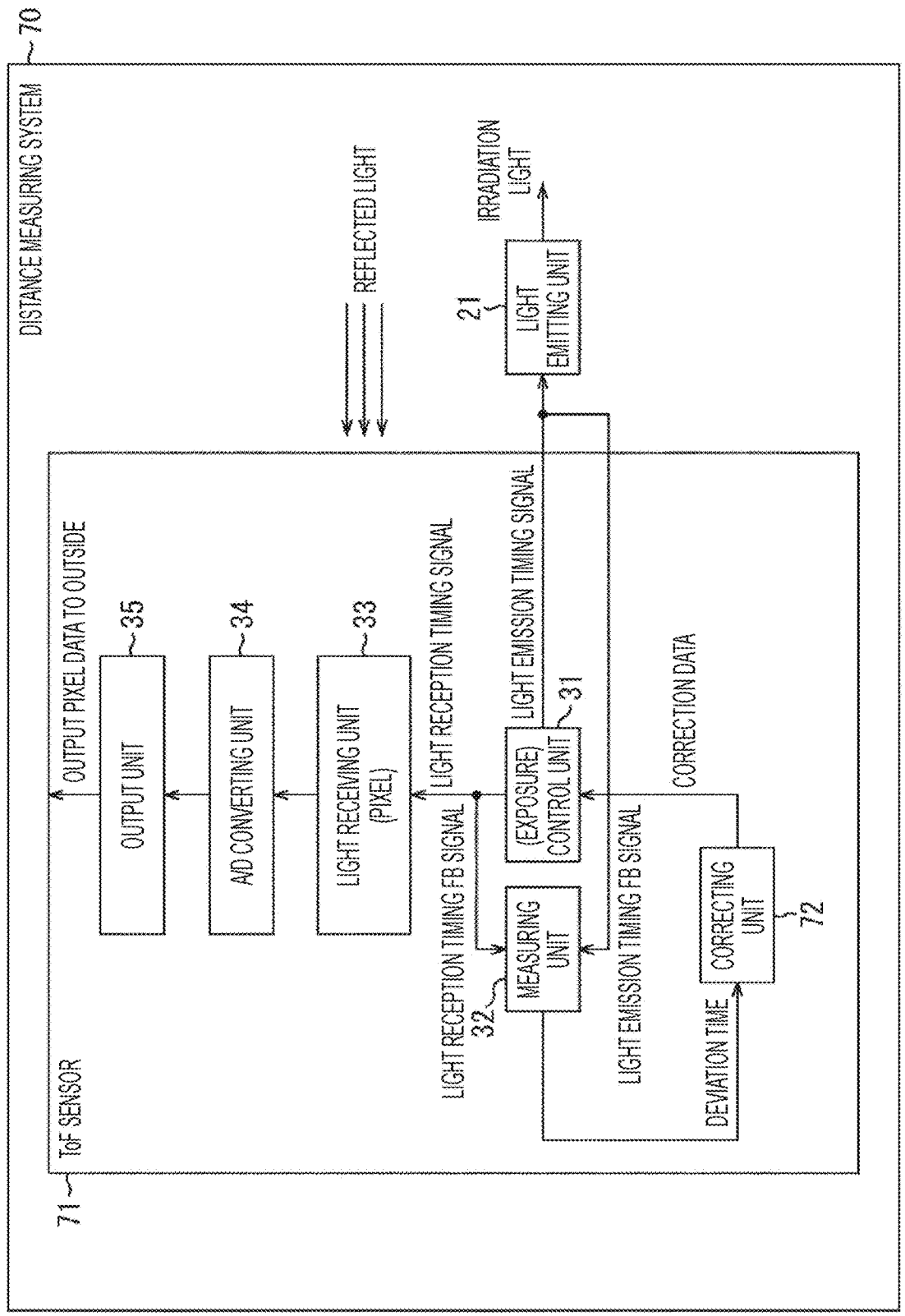
FIG. 9 is a block diagram showing a configuration example of a third embodiment of the distance measuring system to which the present technology is applied.

FIG. 9 is a block diagram showing a configuration example of a third embodiment of the distance measuring system to which the present technology is applied.

Incidentally, in the figure, portions corresponding to those in FIG. 1 are denoted by the same reference numerals, and the description thereof will be omitted as appropriate below.

In FIG. 9, the distance measuring system 70 includes the light emitting unit 21 and a ToF sensor 71, and the ToF sensor 71 includes the correcting unit 22, the control unit 31, the measuring unit 32, the light receiving unit 33, the A/D converting unit 34, and the output unit 35.

The distance measuring system 70 is different from the distance measuring system 10 in that the correcting unit 22 provided outside the ToF sensor 20 in the distance measuring system 10 in FIG. 1 is provided inside the ToF sensor 71 in the distance measuring system 70 in FIG. 9.

As described above, provision of the correcting unit 22 inside the ToF sensor 71 makes it unnecessary to provide the correcting unit 22 outside the ToF sensor 71, thereby facilitating implementation of the distance measuring system 70.

Incidentally, in the distance measuring system 70, in a case where the deviation time measured by the measuring unit 32 is confirmed outside the ToF sensor 71, a terminal that outputs the deviation time to the outside of the ToF sensor 71 needs to be provided to the ToF sensor 71.

On the other hand, in the distance measuring system 10 in FIG. 1, the deviation time measured by the measuring unit 32 is supplied to the correcting unit 22 provided outside the ToF sensor 20, so that the deviation time can be easily grasped outside the ToF sensor 20. Then, on the basis of the deviation time, an error of the distance obtained by distance measurement can be recognized at the time of actual use of the ToF sensor 20, inspection of the ToF sensor 20 after manufacturing, confirmation of operation of the ToF sensor 20 after design, or the like.

Incidentally, in the distance measuring system 70 in FIG. 9, the position where the light emission timing signal supplied from the control unit 31 to the light emitting unit 21 is fed back as the light emission timing FB signal is located outside the ToF sensor 71, but the position where the light emission timing signal is fed back as the light emission timing FB signal may be located inside the ToF sensor 71 as in the case of FIG. 8.

<5. Configuration Example According to Fourth Embodiment of Distance Measuring System>

Figure 10:
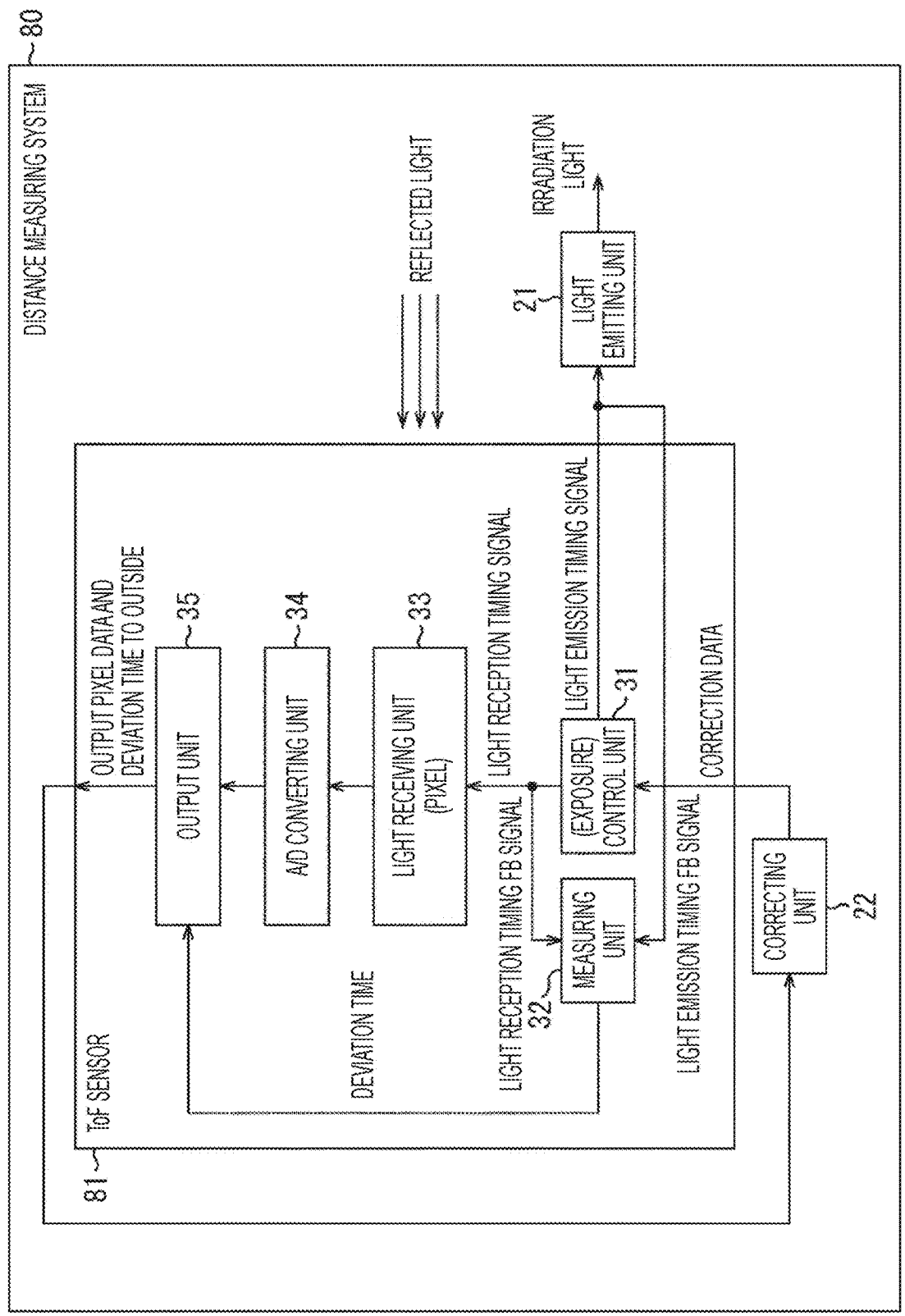
FIG. 10 is a block diagram showing a configuration example of a fourth embodiment of the distance measuring system to which the present technology is applied.

FIG. 10 is a block diagram showing a configuration example of a fourth embodiment of the distance measuring system to which the present technology is applied.

Incidentally, in the figure, portions corresponding to those in FIG. 1 are denoted by the same reference numerals, and the description thereof will be omitted as appropriate below.

In FIG. 10, a distance measuring system 80 includes the ToF sensor 20, the light emitting unit 21, and the correcting unit 22. Therefore, the distance measuring system 80 is constructed in a similar manner to the distance measuring system 10 in FIG. 1.

However, the distance measuring system 80 is different from the distance measuring system 10 directly supplying the deviation time from the measuring unit 32 to the correcting unit 22 outside the ToF sensor 20 in FIG. 1 in that the ToF sensor 20 in FIG. 10 supplies the deviation time output from the measuring unit 32 to the output unit 35 inside the ToF sensor 20 and further supplies the deviation time from the output unit 35 to the correcting unit 22 instead of directly supplying the deviation time to the correcting unit 22 outside the ToF sensor 20.

As described above, in the distance measuring system 80, the deviation time output from the measuring unit 32 is supplied to the output unit 35. Then, in the output unit 35, the deviation time from the measuring unit 32 is output to the outside of the ToF sensor 20. Here, in a case where the deviation time is output from the output unit 35, the output unit 35 can output the deviation time, as embedded data, with the deviation time embedded in the pixel data. In addition, the output unit 35 can output the deviation time measured when obtaining the pixel data by multiplexing before or after the pixel data of the frame. In this manner, in a case where the deviation time is output with the pixel data of the frame by multiplexing, the deviation time for each frame is grasped and the pixel data of the frame, eventually the distance to the object obtained from the pixel data can be corrected using the deviation time.

In the distance measuring system 80 in FIG. 10, the output unit 35 supplies the deviation time from the measuring unit 32 to the correcting unit 22. The correcting unit 22 generates correction data in accordance with the deviation time supplied from the output unit 35 and supplies the correction data to the control unit 31 of the ToF sensor 20 to control the correction of the light emission timing signal and the light reception timing signal in the control unit 31.

It is to be noted that in the distance measuring system 80 in FIG. 10, the position where the light emission timing signal supplied from the control unit 31 to the light emitting unit 21 is fed back as the light emission timing FB signal is located outside the ToF sensor 20, but the position where the light emission timing signal is fed back as the light emission timing FB signal may be located inside the ToF sensor 20 as in the case of FIG. 8.

<6. Sensor Module Using Distance Measuring System>

Figure 11:
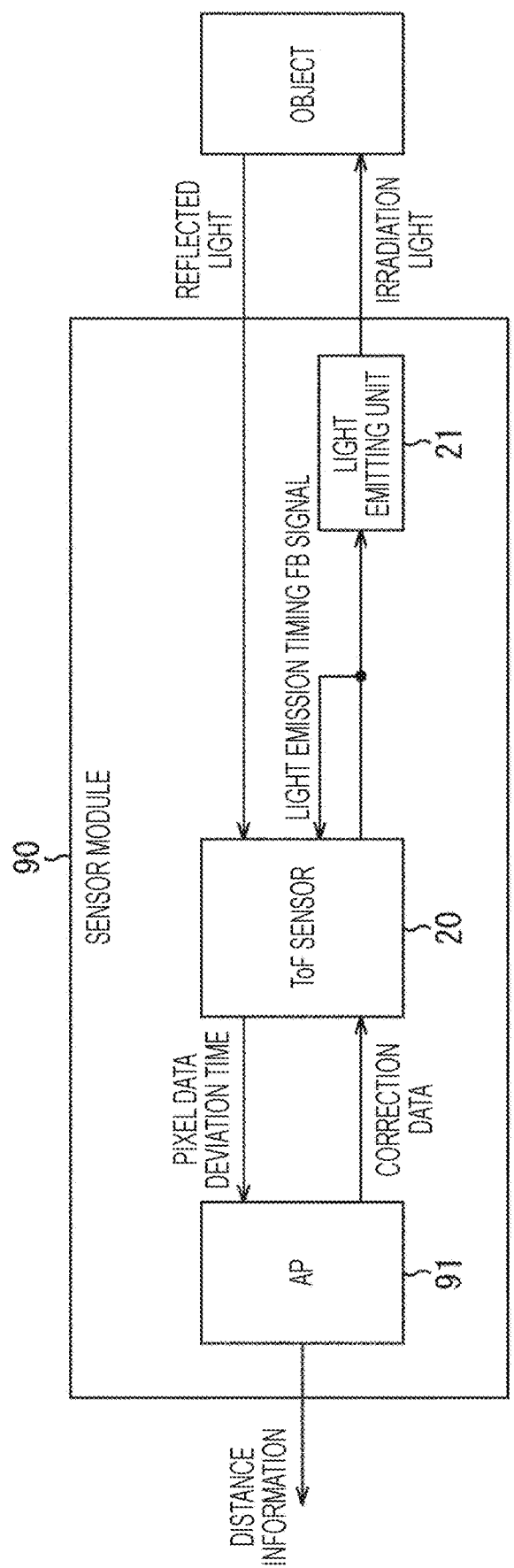
FIG. 11 is a block diagram showing a configuration example of a sensor module to which the present technology is applied.

FIG. 11 is a block diagram showing a configuration example of a sensor module to which the present technology is applied.

In FIG. 11, a sensor module 90 includes the ToF sensor 20, the light emitting unit 21, and an application processor (AP) 91. Therefore, the sensor module 90 is configured using the ToF sensor 20 and the light emitting unit 21 in FIG. 1.

In the sensor module 90 configured as described above, the ToF sensor 20 performs the measurement operation, distance measuring operation, and reading out of the pixel signal, as illustrated in FIG. 3 or 4. Then, the pixel data obtained as a result of the distance measuring operation and reading out of the pixel signal is supplied from the output unit 35 to the AP 91, and the deviation time obtained as a result of the measurement operation is supplied from the measuring unit 32 to the AP 91.

The AP 91 calculates distance information indicating the distance to the object by using the pixel data from the ToF sensor 20. Furthermore, the AP 91 generates correction data by using the deviation time from the ToF sensor 20 and supplies the correction data to the ToF sensor 20.

In the ToF sensor 20, the control unit 31 corrects the light emission timing signal and the light reception timing signal by using the correction data from the AP 91.

Incidentally, the sensor module 90 in FIG. 11 can be configured using the ToF sensor 20 in FIG. 8 or the ToF sensor 20 in FIG. 10 in addition to the ToF sensor 20 shown in FIG. 1.

Further, the sensor module 90 in FIG. 11 can be configured by using the ToF sensor 71 shown in FIG. 9 instead of the ToF sensor 20. However, in a case where the sensor module 90 is configured using the ToF sensor 71 in FIG. 9, since the correction data is generated using the deviation time by the correcting unit 22 provided inside the ToF sensor 71, it is unnecessary to supply the deviation time from the ToF sensor 71 to the AP 91 and to supply the correction data from the AP 91 to the ToF sensor 71.

The distance measurement is performed by the ToF method in the distance measuring system 10 in FIG. 1, distance measuring system 60 in FIG. 8 to distance measuring system 80 in FIG. 10, and sensor module 90 in FIG. 11 described above. In the distance measurement of the ToF method, an object is irradiated with a predetermined modulated light such as a pulsed light as irradiation light, and reflected light of the irradiation light from the object is received, so that the distance L to the object is calculated on the basis of the time Δt from the emission of the irradiation light to the reception of the reflected light (hereinafter, also referred to as reflection time).

That is, the reflection time Δt is the time from when the irradiation light is emitted until when the light is reflected by the object and returns, and assuming that the light speed is expressed as c [m/s], the distance L to the object is given by the equation $L = c \times \Delta t / 2$.

Therefore, the distance L to the object can be obtained by obtaining the reflection time Δt. Incidentally, the reflection time Δt can also be referred to as the phase difference between the irradiation light and the reflected light.

Figure 12:
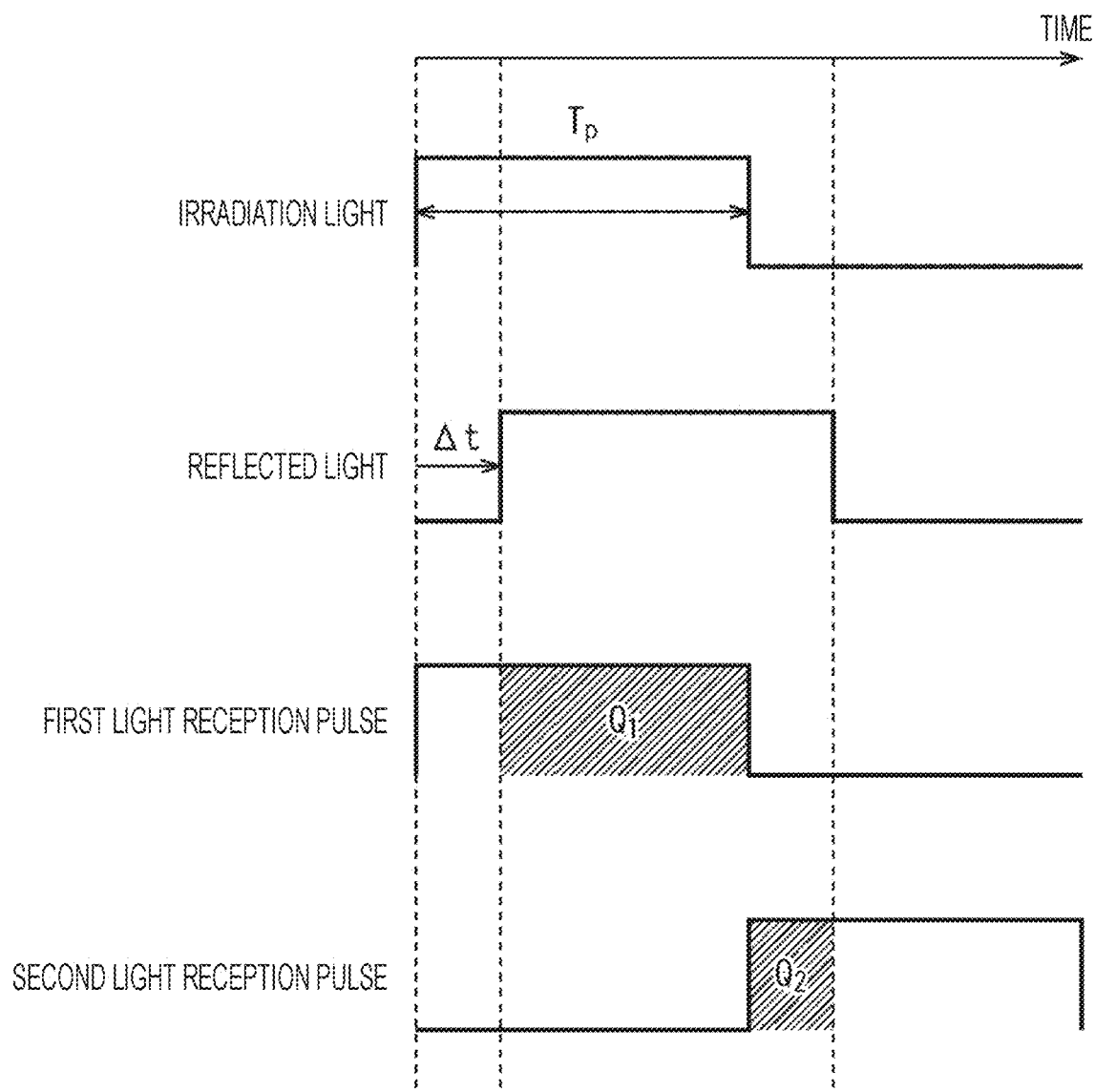
FIG. 12 is a diagram for illustrating the principle of the method of calculating the reflection time Δt.

FIG. 12 is a diagram for illustrating the principle of the method of calculating the reflection time Δt.

Here, in FIG. 12, as the irradiation light, for example, a pulsed light with a predetermined pulse width Tp is adopted. Furthermore, pulse having the same pulse width and the same phase as those of the pulsed light as the irradiation light is referred to as a first light reception pulse and a pulse having the same pulse width as that of the pulsed light as the irradiation light and having a phase shifted by the pulse width Tp is referred to as a second light reception pulse.

The first light reception pulse and the second light reception pulse correspond to the light reception timing signal, and the ToF sensor 20 and the ToF sensor 71 receive the reflected light during each of a period (of the H (High) level) of the first light reception pulse and a period of the second light reception pulse.

It is now assumed that the charge amount (received light amount) of the reflected light received during the period of the first light reception pulse is denoted as Q1 and the charge amount of the reflected light received during the period of the second light reception pulse is denoted as Q2.

In this case, the reflection time Δt can be obtained according to the equation $\Delta t = Tp \times Q2/(Q1+Q2)$.

The charge amounts Q1 and Q2 correspond to pixel data. Therefore, the distance L to the object can be obtained according to the equation $\Delta t = Tp \times Q2/(Q1+Q2)$ and the equation $L = c \times \Delta t / 2$ by use of the pixel data.

<7. Description of Computer to which Present Technology is Applied>

Next, a series of processes of the control unit 31, the measuring unit 32, etc. described above can be performed by software as well as hardware. In a case where a series of processes is performed by software, a program constituting the software is installed in the computer.

Figure 13:
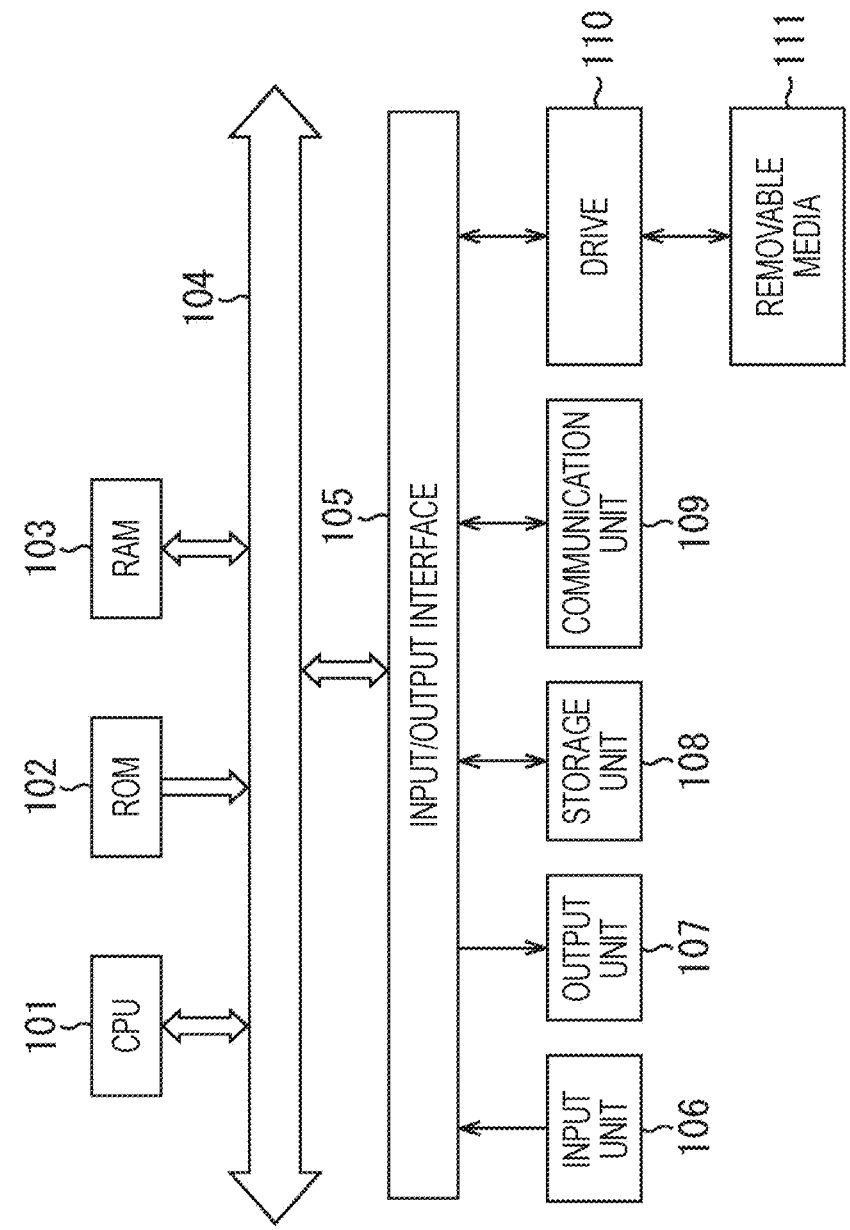
FIG. 13 is a block diagram showing a configuration example of an embodiment of a computer to which the present technology is applied.

Therefore, FIG. 13 shows a configuration example of an embodiment of a computer in which a program for executing the series of processes described above is installed.

In FIG. 13, a central processing unit (CPU) 101 executes various types of processing according to a program stored in a read only memory (ROM) 102 or a program loaded from a storage unit 108 to a random access memory (RAM) 103. The RAM 103 also stores data and the like necessary for the CPU 101 to execute various types of processing, as appropriate.

The CPU 101, ROM 102, and RAM 103 are interconnected via a bus 104. An input/output interface 105 is also connected to the bus 104.

An input unit 106 including a keyboard, a mouse, and the like, an output unit 107 including a display constituted by, for example, a liquid crystal display (LCD), a speaker, and the like, the storage unit 108 including a hard disk and the like, a communication unit 109 including a modem, a terminal adapter and the like are connected to the input/output interface 105. The communication unit 109 performs communication processing via a network such as the Internet.

A drive 110 is connected to the input/output interface 105 as necessary, and removable media 111 such as a magnetic disk, an optical disk, a magneto-optical disk, and a semiconductor memory are appropriately mounted, and a computer program read out therefrom is installed in the storage unit 108 as necessary.

It is to be noted that the program executed by the computer may be a program in which processing is performed in chronological order according to the order described in the present specification, or may be a program in which processing is performed in parallel, or at a necessary timing such as when a call is made.

<8. Application Example to Movable Body>

The technology according to the present disclosure (the present technology) can be applied to various products. For example, the technology according to the present disclosure may be implemented as a device mounted on any type of movable bodies such as automobiles, electric vehicles, hybrid electric vehicles, motorcycles, bicycles, personal mobility, airplanes, drones, ships, and robots.

Figure 14:
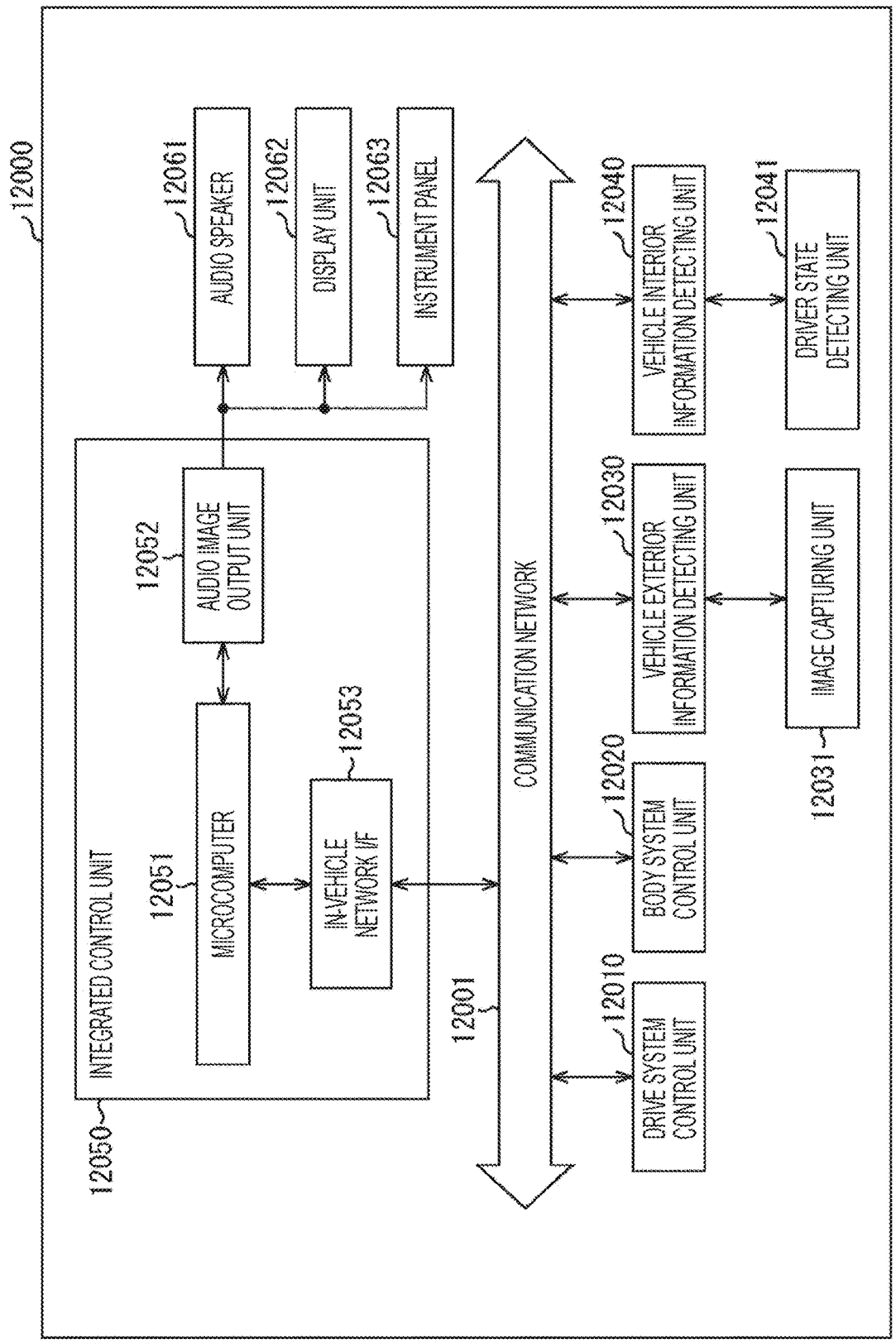
FIG. 14 is a block diagram showing an example of a schematic configuration of a vehicle control system.

FIG. 14 is a block diagram showing a schematic configuration example of a vehicle control system which is an example of a movable body control system to which the technique according to the present disclosure can be applied.

A vehicle control system 12000 includes a plurality of electronic control units connected via a communication network 12001. In the example shown in FIG. 14, the vehicle control system 12000 includes a drive system control unit 12010, a body system control unit 12020, a vehicle exterior information detecting unit 12030, a vehicle interior information detecting unit 12040, and an integrated control unit 12050. In addition, a microcomputer 12051, an audio image output unit 12052, and an in-vehicle network interface (I/F) 12053 are shown as a functional configuration of the integrated control unit 12050.

The drive system control unit 12010 controls the operation of devices related to the drive system of the vehicle according to the various programs. For example, the drive system control unit 12010 functions as a control device for a driving force generating device, such as an internal combustion engine or a driving motor, for generating a driving force of a vehicle, a driving force transmitting mechanism for transmitting a driving force to the wheels, a steering mechanism for adjusting the rudder angle of the vehicle, a braking device for generating a braking force of the vehicle, and the like.

The body system control unit 12020 controls the operation of various devices equipped on the vehicle body according to various programs. For example, the body system control unit 12020 functions as a control device for a keyless entry system, smart key system, power window device, or various lamps such as a head lamp, back lamp, brake lamp, direction indicator, or fog lamp. In this case, a radio wave transmitted from a portable device that substitutes for a key or signals of various switches can be input into the body system control unit 12020. The body system control unit 12020 receives input of these radio waves or signals and controls the door lock device, power window device, lamp, etc. of the vehicle.

The vehicle exterior information detecting unit 12030 detects information outside the vehicle on which the vehicle control system 12000 is mounted. For example, an image capturing unit 12031 is connected to the vehicle exterior information detecting unit 12030. The vehicle exterior information detecting unit 12030 causes the image capturing unit 12031 to capture an image of the exterior of the vehicle and receives the captured image. The vehicle exterior information detecting unit 12030 may perform object detection processing or distance detection processing for a person, a car, an obstacle, a sign, a character on a road surface, or the like, on the basis of the received image.

The image capturing unit 12031 is an optical sensor that receives light and outputs an electric signal corresponding to the reception amount of the light. The image capturing unit 12031 can output the electric signal as an image, and can output the electric signal as the information of distance measurement. In addition, the light received by the image capturing unit 12031 may be visible light and invisible light such as infrared light.

The vehicle interior information detecting unit 12040 detects information inside the vehicle. A driver state detecting unit 12041 for detecting the state of the driver is connected to the vehicle interior information detecting unit 12040, for example. The driver state detecting unit 12041 includes, for example, a camera that captures images of the driver, and the vehicle interior information detecting unit 12040 may calculate the degree of fatigue or degree of concentration of the driver on the basis of the detected information input from the driver state detecting unit 12041 and may determine whether or not the driver is dozing off.

The microcomputer 12051 calculates the control target value of the driving force generating device, steering mechanism, or braking device on the basis of the information inside and outside the vehicle acquired by the vehicle exterior information detecting unit 12030 or the vehicle interior information detecting unit 12040, and can output a control command to the drive system control unit 12010. For example, the microcomputer 12051 can perform cooperative control for the purpose of implementing the function of advanced driver assistance system (ADAS) including collision avoidance or impact mitigation of the vehicle, follow-up driving based on the distance between vehicles, vehicle speed maintenance driving, vehicle collision warning, vehicle lane departure warning, etc.

Further, the microcomputer 12051 can control the driving force generating device, steering mechanism, braking device, or the like on the basis of the information regarding the surroundings of the vehicle acquired by the vehicle exterior information detecting unit 12030 or the vehicle interior information detecting unit 12040, so as to perform cooperative control aiming for automatic driving or the like for autonomous travel without depending on the driver's operation.

In addition, the microcomputer 12051 can output a control command to the body system control unit 12030, on the basis of the information regarding the outside of the vehicle acquired by the vehicle exterior information detecting unit 12030. For example, the microcomputer 12051 controls the head lamp according to the position of a preceding vehicle or an oncoming vehicle detected by the vehicle exterior information detecting unit 12030, and can perform cooperative control aiming for antiglare such as switching the high beam to low beam.

The audio image output unit 12052 transmits at least one of output signals of audio and image to an output device capable of visually or audibly notifying the occupant of the vehicle or the outside of the vehicle about information. In the example of FIG. 14, as an output device, an audio speaker 12061, a display unit 12062, and an instrument panel 12063 are illustrated. The display unit 12062 may include at least one of an on-board display or a head-up display, for example.

Figure 15:
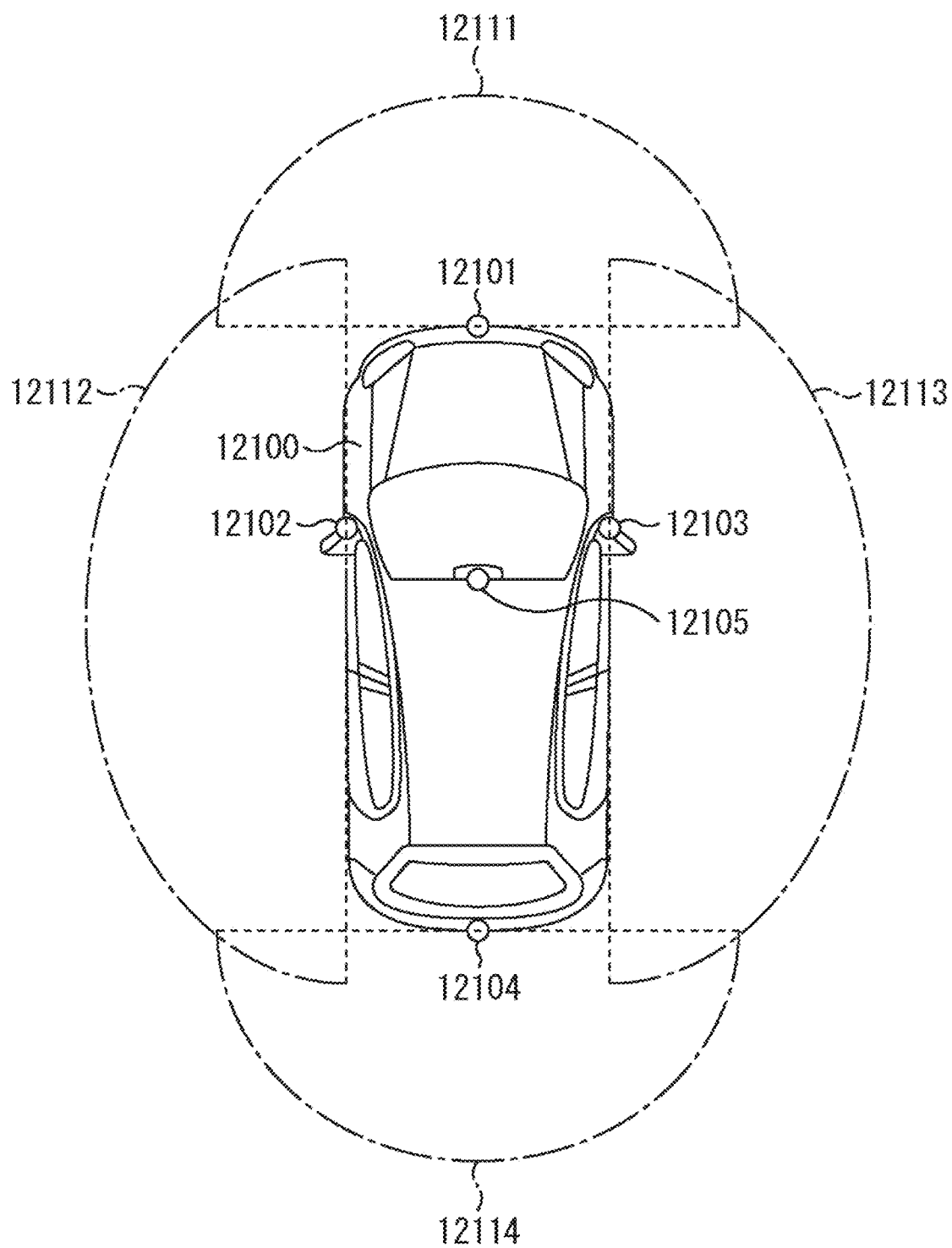
FIG. 15 is an explanatory diagram showing an example of installation positions of a vehicle exterior information detecting unit and an image capturing unit.

FIG. 15 is a diagram showing an example of the installation position of the image capturing unit 12031.

Image capturing units 12101, 12102, 12103, 12104, and 12105 are included in FIG. 15, as the image capturing unit 12031.

For example, the image capturing units 12101, 12102, 12103, 12104, and 12105 are provided at positions such as the front nose, the side mirrors, the rear bumper, the back door, and an upper portion of the windshield in the interior of the vehicle 12100. The image capturing unit 12101 provided on the front nose and the image capturing unit 12105 provided on the upper portion of the windshield in the vehicle interior mainly acquire an image ahead of the vehicle 12100. The image capturing units 12102 and 12103 provided in the side mirrors mainly acquire images of the sides of the vehicle 12100. The image capturing unit 12104 provided in the rear bumper or the back door mainly acquires an image behind the vehicle 12100. The image capturing unit 12105 provided on the upper portion of the windshield in the vehicle interior is mainly used for detecting preceding vehicles, pedestrians, obstacles, traffic signals, traffic signs, lanes, or the like.

Furthermore, FIG. 15 shows an example of the image capturing range of the image capturing units 12101 to 12104. The image capturing range 12111 indicates the image capturing range of the image capturing unit 12101 provided in the front nose, and the image capturing ranges 12112 and 12113 indicate the image capturing ranges of the image capturing units 12102 and 12103 provided in the side mirrors, respectively, and further the image capturing range 12114 indicates the image capturing range of the image capturing unit 12104 provided in the rear bumper or the back door. For example, by overlapping the image data captured by the image capturing units 12101 to 12104, an overhead view image of the vehicle 12100 viewed from above is obtained.

At least one of the image capturing units 12101 to 12104 may have a function of acquiring distance information. For example, at least one of the image capturing units 12101 to 12104 may be a stereo camera including a plurality of image capturing elements, or may be an image capturing element having pixels for phase difference detection.

For example, the microcomputer 12051 can obtain the distance to each three-dimensional object in the image capturing ranges 12111 to 12114 and the temporal change of the distance (relative speed with respect to the vehicle 12100) on the basis of the distance information obtained from the image capturing units 12101 to 12104, so as to particularly extract the nearest three-dimensional object that is on the traveling path of the vehicle 12100 and that is traveling in substantially the same direction as the vehicle 12100 at a predetermined speed (for example, 0 km/h or higher), as a preceding vehicle. Further, the microcomputer 12051 can set in advance an inter-vehicle distance to the preceding vehicle to be secured so as to perform automatic brake control (including follow-up stop control), automatic acceleration control (including follow-up start control), and the like. In this manner, cooperative control aiming for automatic driving or the like that allows an autonomous travel without depending on the operation of the driver can be performed.

For example, on the basis of the distance information obtained from the image capturing units 12101 to 12104, the microcomputer 12051 extracts three-dimensional object data related to three-dimensional objects by classifying the data into a two-wheeled vehicle, a standard-sized vehicle, a large vehicle, a pedestrian, and three-dimensional objects such as a utility pole for the purpose of automatic avoidance of obstacles. For example, the microcomputer 12051 classifies an obstacle around the vehicle 12100 into an obstacle that the driver of the vehicle 12100 can visually confirm and an obstacle that is difficult to visually confirm. Then, the microcomputer 12051 determines the collision risk indicating the risk of collision with each obstacle, so as to output warning for the driver via the audio speaker 12061 and the display unit 12062, or to execute driving assistance for collision avoidance by performing forced deceleration or avoidance steering via the drive system control unit 12010 when the collision risk is higher than the set value and there is a possibility of collision.

At least one of the image capturing units 12101 to 12104 may be an infrared camera for detecting infrared rays. For example, the microcomputer 12051 can recognize a pedestrian by determining whether or not a pedestrian is present in the captured images of the image capturing units 12101 to 12104. Such recognition of a pedestrian is carried out, for example, by a procedure of extracting characteristic points in a captured image of the image capturing units 12101 to 12104 as an infrared camera, and a procedure of determining whether or not the object is a pedestrian by performing a pattern matching processing on a series of characteristic points indicating the outline of the object. When the microcomputer 12051 determines that a pedestrian is present in the captured images of the image capturing units 12101 to 12104 and recognizes the pedestrian, the audio image output unit 12052 controls the display unit 12062 to display and superimpose a square contour line on the recognized pedestrian for emphasis. Further, the audio image output unit 12052 may control the display unit 12062 to display icons or the like indicating pedestrians at desired positions.

An example of the vehicle control system to which the technique according to the present disclosure can be applied has been described above. The technique according to the present disclosure can be applied to the image capturing unit 12031 and the like among the above-described configurations. To be specific, the distance measuring system 10 in FIG. 1, distance measuring system 60 in FIG. 8, distance measuring system 80 in FIG. 10, and sensor module 90 in FIG. 11 can be applied to the image capturing unit 12031. By applying the technique according to the present disclosure to the image capturing unit 12031, the accuracy of distance measurement can be improved and appropriate driving support using an accurate distance can be performed.

Embodiments of the present technology are not limited to the above-described embodiments, and various modifications are possible without departing from the gist of the present technology.

It should be noted that the effects described in the present specification are merely examples and are not limited and there may be effects other than those described in the present specification.

Others

The present technology may have the following configurations.

(1) A distance measuring device including: a light receiving unit for receiving a reflected light from an object of irradiation light emitted from a light emitting unit that emits light; a control unit for controlling a light emitting operation by supplying the light emitting unit with a light emission timing signal for controlling the light emitting operation for emitting the irradiation light and for controlling a light receiving operation by supplying the light receiving unit with a light reception timing signal for controlling the light receiving operation for receiving the reflected light; and a measuring unit that measures a deviation time between a light emission timing at which the light emitting unit emits the irradiation light and a light reception timing at which the light receiving unit receives the reflected light, by using the light emission timing signal and the light reception timing signal.

(2) The distance measuring device described in item (1), in which one or both of the light emission timing signal and the light reception timing signal are corrected according to the deviation time.

(3) The distance measuring device described in item (1) or (2), further including a correcting unit that performs control to correct one or both of the light emission timing signal and the light reception timing signal according to the deviation time.

(4) The distance measuring device described in any one of items (1) to (3), in which the measuring unit measures the deviation time by using the light emission timing signal fed back from the middle of a wiring through which the light emission timing signal is supplied from the control unit to the light emitting unit and the light reception timing signal.

(5) The distance measuring device described in any one of items (1) to (4), in which the measuring unit measures the deviation time in parallel with a distance measuring operation in which the light emitting unit emits the irradiation light, the light receiving unit receives the reflected light, and an electric charge corresponding to the light amount of the reflected light is generated.

(6) A distance measuring method including causing a distance measuring device to measure a deviation time between a light emission timing at which a light emitting unit emits irradiation light and a light reception timing at which a light receiving unit receives reflected light, by using a light emission timing signal and a light reception timing signal, the distance measuring device including the light receiving unit for receiving the reflected light from an object of the irradiation light emitted from the light emitting unit that emits light and a control unit for controlling a light emitting operation by supplying the light emitting unit with the light emission timing signal for controlling the light emitting operation for emitting the irradiation light and for controlling a light receiving operation by supplying the light receiving unit with the light reception timing signal for controlling the light receiving operation for receiving the reflected light.

(7) A distance measuring device including a chip in which a first substrate and a second substrate are stacked and a light emitting unit, in which the first substrate has a light receiving unit, and the second substrate has a control unit, and the control unit supplies a light emission timing signal to the light emitting unit and supplies a light reception timing signal to the light receiving unit.

(8) The distance measuring device described in item (7), in which the second substrate further includes a measuring unit, and the measuring unit measures a deviation time between a light emission timing at which the light emitting unit emits irradiation light and a light reception timing at which the light receiving unit receives reflected light from an object, by using the light emission timing signal and the light reception timing signal.

(9) The distance measuring device described in item (8), in which one or both of the light emission timing signal and the light reception timing signal are corrected according to the deviation time.

(10) The distance measuring device described in item (9), further including a correcting unit that performs control to correct one or both of the light emission timing signal and the light reception timing signal according to the deviation time.

(11) The distance measuring device described in any one of items (8) to (10), in which the measuring unit measures the deviation time by using the light emission timing signal fed back from the middle of a wiring through which the light emission timing signal is supplied from the control unit to the light emitting unit and the light reception timing signal.

(12) The distance measuring device described in any one of items (8) to (11), in which the measuring unit measures the deviation time in parallel with a distance measuring operation in which the light emitting unit emits the irradiation light, the light receiving unit receives the reflected light from the object, and an electric charge corresponding to the light amount of the reflected light is generated.

REFERENCE SIGNS LIST

10 Distance measuring system
20 ToF sensor
21 Light emitting unit
22 Correcting unit
31 Control unit
32 Measuring unit
33 Light receiving unit
34 A/D converting unit
35 Output unit
41 Chip
42 Lower substrate
43 Upper substrate
60, 70 Distance measuring system
71 ToF sensor
80 Distance measuring system
90 Sensor module
91 AP

The invention claimed is:

1. A distance measuring device comprising:
a light receiving unit for receiving a reflected light from an object of irradiation light emitted from a light emitting unit that emits light;
a control unit for controlling a light emitting operation by supplying the light emitting unit with a light emission timing signal for controlling the light emitting operation for emitting the irradiation light and for controlling a light receiving operation by supplying the light receiving unit with a light reception timing signal for controlling the light receiving operation for receiving the reflected light; and
a measuring unit for measuring a deviation time between a light emission timing at which the light emitting unit emits the irradiation light and a light reception timing for controlling the light receiving operation for receiving the reflected light, by using the light emission timing signal and the light reception timing signal, based on a light emission timing fed back signal and a light reception timing fed back signal,
wherein one or both of the light emission timing signal and the light reception timing signal are corrected according to the deviation time.

2. The distance measuring device according to claim 1, further comprising a correcting unit that performs control to correct one or both of the light emission timing signal and the light reception timing signal according to the deviation time.

3. The distance measuring device according to claim 1, wherein the measuring unit measures the deviation time by using the light emission timing signal fed back from the middle of a wiring through which the light emission timing signal is supplied from the control unit to the light emitting unit and the light reception timing signal.

4. The distance measuring device according to claim 1, wherein the measuring unit measures the deviation time in parallel with a distance measuring operation in which the light emitting unit emits the irradiation light, the light receiving unit receives the reflected light, and an electric charge corresponding to a light amount of the reflected light is generated.

5. A distance measuring method comprising:

causing a distance measuring device to measure a deviation time between a light emission timing at which a light emitting unit emits irradiation light and a light reception timing for controlling the light receiving operation for receiving reflected light, by using a light emission timing signal and a light reception timing signal, based on a light emission timing fed back signal and a light reception timing fed back signal, the distance measuring device including:

the light receiving unit for receiving the reflected light from an object of the irradiation light emitted from the light emitting unit that emits light and a control unit for controlling a light emitting operation by supplying the light emitting unit with the light emission timing signal for controlling the light emitting operation for emitting the irradiation light and for controlling a light receiving operation by supplying the light receiving unit with the light reception timing signal for controlling the light receiving operation for receiving the reflected light, wherein one or both of the light emission timing signal and the light reception timing signal are corrected according to the deviation time.

6. A distance measuring device comprising:

a chip in which a first substrate and a second substrate are stacked;

a light emitting unit; and a measuring unit for measuring a deviation time between a light emission timing at which the light emitting unit emits irradiation light and a light reception timing for controlling a light receiving operation for receiving reflected light, by using a light emission timing signal and a light reception timing signal, based on a light emission timing fed back signal and a light reception timing fed back signal, wherein the first substrate has a light receiving unit, and the second substrate has a control unit, the second substrate further comprises a measuring unit, the measuring unit measures a deviation time between a light emission timing at which the light emitting unit emits irradiation light and a light reception timing for controlling the light receiving operation for receiving reflected light from an object, by using the light emission timing signal and the light reception timing signal, and the control unit supplies the light emission timing signal to the light emitting unit and supplies the light reception timing signal to the light receiving unit, wherein one or both of the light emission timing signal and the light reception timing signal are corrected according to the deviation time.

7. The distance measuring device according to claim 6, further comprising a correcting unit that performs control to correct one or both of the light emission timing signal and the light reception timing signal according to the deviation time.

8. The distance measuring device according to claim 6, wherein the measuring unit measures the deviation time by using the light emission timing signal fed back from the middle of a wiring through which the light emission timing signal is supplied from the control unit to the light emitting unit and the light reception timing signal.

9. The distance measuring device according to claim 6, wherein the measuring unit measures the deviation time in parallel with a distance measuring operation in which the light emitting unit emits the irradiation light and the light receiving unit receives the reflected light from the object and an electric charge corresponding to a light amount of the reflected light is generated.

* * * * *